(12) United States Patent
Blagg et al.

(10) Patent No.: US 8,073,736 B2
(45) Date of Patent: Dec. 6, 2011

(54) SYSTEMS AND METHODS FOR REDEEMING REWARDS ASSOCIATED WITH ACCOUNTS

(75) Inventors: Lynn Holm Blagg, Omaha, NE (US); Carol A. Lindsay, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1026 days.

(21) Appl. No.: 11/956,221

(22) Filed: Dec. 13, 2007

(65) Prior Publication Data

US 2008/0091540 A1    Apr. 17, 2008

Related U.S. Application Data

(60) Division of application No. 10/386,027, filed on Mar. 10, 2003, now abandoned, which is a continuation-in-part of application No. 10/237,572, filed on Sep. 9, 2002, and a continuation-in-part of application No. 10/172,378, filed on Jun. 13, 2002, now abandoned, which is a continuation-in-part of application No. 09/298,417, filed on Apr. 23, 1999, now Pat. No. 7,076,465, and a continuation-in-part of application No. 09/298,505, filed on Apr. 23, 1999, now Pat. No. 7,050,996, and a continuation-in-part of application No. 09/298,521, filed on Apr. 23, 1999, now Pat. No. 7,340,423.

(60) Provisional application No. 60/083,004, filed on Apr. 24, 1998.

(51) Int. Cl.
  *G06Q 30/00* (2006.01)
(52) U.S. Cl. .................................... 705/14.25
(58) Field of Classification Search ............... 705/14.25
  See application file for complete search history.

(56) References Cited

U.S. PATENT DOCUMENTS

| 4,256,955 | A | 3/1981 | Giraud et al. |
| 4,321,672 | A | 3/1982 | Braun et al. |
| 4,679,191 | A | 7/1987 | Nelson et al. |

(Continued)

FOREIGN PATENT DOCUMENTS

EP    0540234 A2    5/1993

(Continued)

OTHER PUBLICATIONS

Dowling, Grahame R; Uncles, Mark; Do Customer Loyalty Programs Really Work?; Sloan Management Review; v38n4; Summer 1997; pp. 71-82.*

(Continued)

*Primary Examiner* — John G. Weiss
*Assistant Examiner* — Michael Stibley
(74) *Attorney, Agent, or Firm* — Kilpatrick Townsend & Stockton LLP

(57) ABSTRACT

Among other things, the present invention provides systems and methods for fulfilling reward redemptions. In some cases, the systems and methods receive redemption requests associated with an account. The redemption request can be satisfied from a reward associated with the account, or by accessing a reward associated with another account. Redeeming a reward from another account can involve transferring value from one account to another, or grouping the related accounts and allowing members of the group to perform the settlement function. Various of the systems and method further provide for performing automatic reward redemptions, either by an entity maintaining the account to which the reward is associated, or through use of a fulfillment entity.

17 Claims, 18 Drawing Sheets

U.S. PATENT DOCUMENTS

| | | |
|---|---|---|
| 4,700,055 A | 10/1987 | Kashkashian, Jr. |
| 4,816,653 A | 3/1989 | Anderl et al. |
| 4,837,422 A | 6/1989 | Dethloff et al. |
| 4,900,903 A | 2/1990 | Wright et al. |
| 4,918,602 A | 4/1990 | Bone et al. |
| 5,025,372 A | 6/1991 | Burton et al. |
| 5,121,945 A | 6/1992 | Thomson et al. |
| 5,155,342 A | 10/1992 | Urano |
| 5,191,522 A | 3/1993 | Bosco et al. |
| 5,231,569 A | 7/1993 | Myatt et al. |
| 5,339,392 A | 8/1994 | Risberg et al. |
| 5,410,684 A | 4/1995 | Ainsworth et al. |
| 5,457,305 A | 10/1995 | Akel et al. |
| 5,465,206 A | 11/1995 | Hilt et al. |
| 5,475,585 A | 12/1995 | Bush |
| 5,483,444 A | 1/1996 | Heintzeman et al. |
| 5,483,445 A | 1/1996 | Pickering |
| 5,485,370 A | 1/1996 | Moss et al. |
| 5,500,513 A | 3/1996 | Langhans et al. |
| 5,513,102 A | 4/1996 | Auriemma |
| 5,530,232 A | 6/1996 | Taylor |
| 5,537,314 A | 7/1996 | Kanter |
| 5,546,523 A | 8/1996 | Gatto |
| 5,560,005 A | 9/1996 | Hoover |
| 5,590,038 A | 12/1996 | Pirtoda |
| 5,613,012 A | 3/1997 | Hoffman et al. |
| 5,614,703 A | 3/1997 | Martin et al. |
| 5,615,109 A | 3/1997 | Eder |
| 5,621,640 A | 4/1997 | Burke |
| 5,644,727 A | 7/1997 | Atkins |
| 5,648,906 A | 7/1997 | Amiripanahi |
| 5,649,117 A | 7/1997 | Landry |
| 5,649,118 A | 7/1997 | Carlisle et al. |
| 5,650,604 A | 7/1997 | Marcous et al. |
| 5,668,993 A | 9/1997 | Peters et al. |
| 5,684,965 A | 11/1997 | Pickering |
| 5,770,843 A | 6/1998 | Rose et al. |
| 5,774,870 A * | 6/1998 | Storey ........................ 705/14.27 |
| 5,783,808 A | 7/1998 | Josephson |
| 5,802,511 A | 9/1998 | Kouchi et al. |
| 5,819,263 A | 10/1998 | Bromley et al. |
| 5,826,243 A | 10/1998 | Musmanno et al. |
| 5,852,811 A | 12/1998 | Atikins |
| 5,859,419 A | 1/1999 | Wynn |
| 5,864,830 A | 1/1999 | Armetta et al. |
| 5,873,072 A | 2/1999 | Kight et al. |
| 5,875,437 A | 2/1999 | Atkins |
| 5,897,625 A | 4/1999 | Gustin et al. |
| 5,903,830 A | 5/1999 | Joao et al. |
| 5,914,472 A | 6/1999 | Foladare et al. |
| 5,920,847 A | 7/1999 | Kolling et al. |
| 5,937,391 A | 8/1999 | Ikeda et al. |
| 5,940,811 A | 8/1999 | Norris |
| 5,943,656 A | 8/1999 | Crooks et al. |
| 5,953,710 A | 9/1999 | Fleming |
| 5,970,480 A | 10/1999 | Kalina |
| 5,978,780 A | 11/1999 | Watson |
| 5,984,180 A | 11/1999 | Albrecht |
| 5,991,736 A | 11/1999 | Ferguson et al. |
| 5,999,596 A | 12/1999 | Walker et al. |
| 5,999,624 A | 12/1999 | Hopkins |
| 6,009,415 A | 12/1999 | Shurling et al. |
| 6,012,048 A | 1/2000 | Gustin et al. |
| 6,018,718 A | 1/2000 | Walker et al. |
| 6,021,397 A | 2/2000 | Jones et al. |
| 6,021,943 A | 2/2000 | Chastain |
| 6,035,285 A | 3/2000 | Schlect et al. |
| 6,044,360 A | 3/2000 | Picciallo |
| 6,049,782 A | 4/2000 | Gottesman et al. |
| 6,061,660 A | 5/2000 | Eggleston et al. |
| 6,081,790 A | 6/2000 | Rosen |
| 6,092,055 A | 7/2000 | Owens et al. |
| 6,105,008 A | 8/2000 | Davis et al. |
| 6,108,641 A | 8/2000 | Kenna et al. |
| 6,119,109 A | 9/2000 | Muratani et al. |
| 6,128,599 A * | 10/2000 | Walker et al. ............. 705/14.27 |
| 6,128,602 A | 10/2000 | Northington et al. |
| 6,128,603 A | 10/2000 | Dent et al. |
| 6,131,810 A | 10/2000 | Weiss et al. |
| 6,138,107 A | 10/2000 | Elgamal |
| 6,226,364 B1 | 5/2001 | O'Neil |
| 6,226,623 B1 | 5/2001 | Schein et al. |
| 6,260,024 B1 | 7/2001 | Shkedy |
| 6,273,816 B1 | 8/2001 | Bansal et al. |
| 6,289,318 B1 | 9/2001 | Barber |
| 6,292,789 B1 | 9/2001 | Schutzer |
| 6,304,860 B1 | 10/2001 | Martin, Jr. et al. |
| 6,311,170 B1 | 10/2001 | Embrey |
| 6,324,524 B1 | 11/2001 | Lent et al. |
| 6,327,573 B1 | 12/2001 | Walker et al. |
| 6,327,577 B1 | 12/2001 | Garrison et al. |
| 6,332,126 B1 | 12/2001 | Pierce et al. |
| 6,379,247 B1 | 4/2002 | Walker et al. |
| 6,401,079 B1 | 6/2002 | Kahn et al. |
| 6,405,181 B2 | 6/2002 | Lent et al. |
| 6,422,462 B1 | 7/2002 | Cohen |
| 6,549,912 B1 | 4/2003 | Chen |
| 6,607,136 B1 | 8/2003 | Atsmon et al. |
| 6,623,415 B2 | 9/2003 | Gates et al. |
| 6,636,833 B1 | 10/2003 | Flitcroft et al. |
| 6,661,217 B2 | 12/2003 | Kimball et al. |
| 6,764,013 B2 | 7/2004 | Ben-Aissa |
| 6,779,319 B2 | 8/2004 | Smith et al. |
| 6,802,500 B2 | 10/2004 | Bennett et al. |
| 6,829,588 B1 | 12/2004 | Stoutenburg et al. |
| 6,865,547 B1 | 3/2005 | Brake et al. |
| 6,925,441 B1 | 8/2005 | Jones et al. |
| 6,985,867 B1 | 1/2006 | Pryor et al. |
| 7,050,996 B1 | 5/2006 | Blagg et al. |
| 7,076,465 B1 | 7/2006 | Blagg et al. |
| 7,225,155 B1 | 5/2007 | Polk |
| 7,305,347 B1 | 12/2007 | Joao |
| 7,340,423 B1 | 3/2008 | Blagg et al. |
| 2001/0018679 A1 | 8/2001 | Lee |
| 2001/0032192 A1 | 10/2001 | Putta et al. |
| 2001/0034720 A1 | 10/2001 | Armes |
| 2001/0042785 A1 | 11/2001 | Walker et al. |
| 2001/0051923 A1 | 12/2001 | Kosuda |
| 2002/0069122 A1 | 6/2002 | Yun et al. |
| 2002/0103746 A1 | 8/2002 | Moffett et al. |
| 2002/0123376 A1 | 9/2002 | Walker et al. |
| 2002/0123962 A1 | 9/2002 | Bryman et al. |
| 2002/0138424 A1 | 9/2002 | Coyle |
| 2002/0156723 A1 | 10/2002 | Lilly et al. |
| 2002/0198806 A1 | 12/2002 | Blagg et al. |
| 2003/0074311 A1 | 4/2003 | Saylors et al. |
| 2003/0083933 A1 | 5/2003 | McAlear |
| 2003/0115160 A1 | 6/2003 | Nowlin et al. |
| 2003/0120571 A1 | 6/2003 | Blagg |
| 2003/0135438 A1 | 7/2003 | Blagg et al. |
| 2003/0149660 A1 | 8/2003 | Canfield |
| 2003/0171992 A1 | 9/2003 | Blagg et al. |
| 2003/0182218 A1 | 9/2003 | Blagg |
| 2003/0212620 A1 | 11/2003 | Blagg |
| 2004/0030657 A1 | 2/2004 | Holm-Blagg et al. |
| 2004/0117302 A1 | 6/2004 | Weichert et al. |
| 2004/0148239 A1 | 7/2004 | Albee et al. |
| 2004/0158532 A1 | 8/2004 | Breck et al. |
| 2005/0154664 A1 | 7/2005 | Guy et al. |

FOREIGN PATENT DOCUMENTS

| | | |
|---|---|---|
| EP | 0725376 | 8/1996 |
| WO | WO 97-43893 | 11/1997 |
| WO | WO 01-57709 | 8/2001 |

OTHER PUBLICATIONS

U.S. Appl. No. 11/187,605, Advisory Action dated Nov. 3, 2008, 3 pages.

U.S. Appl. No. 11/187,605, Final Office Action dated Jul. 8, 2008, 19 pages.

U.S. Appl. No. 10/025,092, Advisory Action dated Oct. 20, 2008, 3 pages.

U.S. Appl. No. 10/025,092, Final Office Action dated Aug. 5, 2008, 9 pages.

"Modular ATM Gives Boost to Diebold", Akron Beacon Journal, Jul. 12, 1997, 2 pages.

Air Miles Reward Program; "Terms and conditions of the Air Miles Reward Program"; May 1998, 1 page.

"Virginia Bank Aims to Gain Accounts through Pact with Debit Card Issuer", American Banker v164 n93 p. 7, May 17, 1999, 3 pages.

Svaldi, Aldo "Debitlike card assists access to child-support aid." Denver, CO: Feb. 11, 2003, p. C.01, 3 pages.

Western Union—First Data Corp. "Trans$Pay . . . soon to be the Western Union Pay Card", no date, 1 page.

Western Union—First Data Corp. FDX-400 Remote Payroll Distribution, 1998, 1 page.

White, Ron "How Computers Work", 3rd Edition, Que Corporation, Sep. 1998, 38 pages.

U.S. Appl. No. 09/298,417, Office Action dated Mar. 27, 2002, 7 pages.

U.S. Appl. No. 09/298,417, Office Action dated Dec. 27, 2002, 8 pages.

U.S. Appl. No. 09/298,417, Office Action dated Jun. 9, 2003, 8 pages.

U.S. Appl. No. 09/298,417, Office Action dated Nov. 5, 2003, 7 pages.

U.S. Appl. No. 09/298,417, Notice of Appeal dated Jun. 27, 2003, 4 pages.

U.S. Appl. No. 09/298,505, Final Office Action dated Oct. 19, 2004, 5 pages.

U.S. Appl. No. 09/298,505, Final Office Action dated Jan. 23, 2002, 11 pages.

U.S. Appl. No. 09/298,505, Office Action dated May 22, 2001, 7 pages.

U.S. Appl. No. 11/187,605, Office Action dated Jan. 8, 2008, 17 pages.

U.S. Appl. No. 11/187,605, Advisory Action dated Oct. 18, 2007, 3 pages.

U.S. Appl. No. 11/187,605, Final Office Action dated Aug. 2, 2007, 16 pages.

U.S. Appl. No. 11/187,605, Office Action dated Mar. 13, 2007, 15 pages.

U.S. Appl. No. 11/187,605, Final Office Action dated Nov. 30, 2006, 8 pages.

U.S. Appl. No. 11/187,605, Office Action dated Jun. 16, 2006, 5 pages.

U.S. Appl. No. 10/025,092, Office Action dated Apr. 3, 2008, 9 pages.

U.S. Appl. No. 10/025,092, Advisory Action dated Dec. 26, 2007, 3 pages.

U.S. Appl. No. 10/025,092, Final Office Action dated Oct. 18, 2007, 8 pages.

U.S. Appl. No. 10/025,092, Office Action dated May 4, 2007, 8 pages.

U.S. Appl. No. 10/371,852, Office Action dated Aug. 10, 2007, 7 pages.

U.S. Appl. No. 10/371,852, Final Office Action dated May 1, 2008, 7 pages.

U.S. Appl. No. 10/319,422, Office Action dated Mar. 3, 2008, 12 pages.

U.S. Appl. No. 10/319,422, Advisory Action dated Nov. 30, 2007, 3 pages.

U.S. Appl. No. 10/319,422, Final Office Action dated Aug. 22, 2007, 11 pages.

U.S. Appl. No. 10/319,422, Office Action dated Mar. 8, 2007, 11 pages.

U.S. Appl. No. 10/373,637, Advisory Action dated Apr. 1, 2008, 3 pages.

U.S. Appl. No. 10/373,637, Final Office Action dated Jan. 11, 2008, 24 pages.

U.S. Appl. No. 10/373,637, Office Action dated Aug. 15, 2007, 23 pages.

U.S. Appl. No. 11/191,444, Final Office Action dated Apr. 25, 2008, 7 pages.

U.S. Appl. No. 11/191,444, Office Action dated Oct. 18, 2007, 6 pages.

U.S. Appl. No. 11/191,444, Office Action dated Dec. 28, 2006, 8 pages.

U.S. Appl. No. 09/298,521, Notice of Allowance dated Oct. 3, 2007, 10 pages.

U.S. Appl. No. 09/298,521, Ex Parte Quayle Action dated Jul. 25, 2007, 7 pages.

U.S. Appl. No. 09/298,521, Office Action dated Jun. 5, 2007, 6 pages.

U.S. Appl. No. 09/298,521, Office Action dated Nov. 3, 2003, 9 pages.

U.S. Appl. No. 09/298,521, Final Office Action dated Jul. 26, 2002, 7 pages.

U.S. Appl. No. 09/298,521, Office Action dated Nov. 27, 2001, 7 pages.

U.S. Appl. No. 09/298,521, Office Action dated May 30, 2001, 7 pages.

U.S. Appl. No. 10/205,482, Final Office Action dated Jan. 16, 2008, 13 pages.

U.S. Appl. No. 10/205,482, Office Action dated Jul. 6, 2007, 13 pages.

U.S. Appl. No. 10/172,378, Office Action dated Feb. 12, 2008, 11 pages.

U.S. Appl. No. 10/172,378, Final Office Action dated Nov. 9, 2007, 11 pages.

U.S. Appl. No. 10/172,378, Office Action dated Jun. 13, 2007, 11 pages.

U.S. Appl. No. 10/238,572, Examiner's Answer to Appeal Brief dated Aug. 10, 2007, 18 pages.

U.S. Appl. No. 10/237,572, Office Action dated Aug. 15, 2006, 14 pages.

U.S. Appl. No. 10/237,572, Advisory Action dated Nov. 30, 2004, 2 pages.

U.S. Appl. No. 10/237,572, Final Office Action dated Sep. 8, 2004, 18 pages.

U.S. Appl. No. 10/237,572, Office Action dated Mar. 25, 2004, 14 pages.

U.S. Appl. No. 10/672,596, Final Office Action dated Dec. 31, 2007, 12 pages.

U.S. Appl. No. 10/672,596, Office Action dated Jul. 5, 2007, 8 pages.

U.S. Appl. No. 10/987,031, Office Action dated Jan. 25, 2008, 15 pages.

U.S. Appl. No. 10/386,027, Office Action dated Feb. 14, 2008, 11 pages.

U.S. Appl. No. 11/533,041, Office Action dated Apr. 10, 2008, 10 pages.

U.S. Appl. No. 10/371,852, Advisory Action dated Jul. 21, 2008, 2 pages.

U.S. Appl. No. 10/319,422, Final Office Action dated Sep. 17, 2008, 11 pages.

U.S. Appl. No. 10/373,637, Office Action dated Jul. 8, 2008, 22 pages.

U.S. Appl. No. 11/191,444, Final Office Action dated Sep. 5, 2008, 7 pages.

U.S. Appl. No. 10/205,482, Advisory Action dated Jul. 15, 2008, 3 pages.

U.S. Appl. No. 10/172,378, Final Office Action dated Aug. 6, 2008, 18 pages.

U.S. Appl. No. 10/172,378, Final Office Action dated Oct. 21, 2008, 17 pages.

U.S. Appl. No. 10/237,572, Examiner's Answer to Appeal Brief dated May 18, 2007, 17 pages.

U.S. Appl. No. 10/987,031, Final Office Action dated Aug. 28, 2008, 18 pages.

U.S. Appl. No. 10/386,027, Advisory Action dated Oct. 31, 2008, 3 pages.

U.S. Appl. No. 10/386,027, Final Office Action dated Aug. 21, 2008, 10 pages.

U.S. Appl. No. 11/533,041, Advisory Action dated Nov. 4, 2008, 3 pages.

U.S. Appl. No. 11/533,041, Final Office Action dated Aug. 7, 2008, 12 pages.

U.S. Appl. No. 11/956,235, Office Action dated Aug. 19, 2008, 11pages.

U.S. Appl. No. 10/386,027, Final Office Action dated Feb. 18, 2009, 11 pages.

* cited by examiner

Create Group Using Existing Accounts

SYSTEMS AND METHODS FOR REDEEMING REWARDS ASSOCIATED WITH ACCOUNTS

CROSS-REFERENCES TO RELATED APPLICATIONS

This U.S. patent application is a divisional of U.S. patent application Ser. No. 10/386,027 entitled "System and Methods for Redeeming Rewards Associated With Accounts" and filed on Mar. 10, 2003. U.S. application Ser. No. 10/386,027 is a continuation-in-part of the following applications: U.S. patent application Ser. No. 10/237,572 entitled "Multiple Credit Line Presentation Instrument," filed on Sep. 9, 2002; and U.S. patent application Ser. No. 10/172,378 entitled "Systems and Methods for Accessing and Modifying Usage Parameters Associated with a Financial Transaction Account," filed on Jun. 13, 2002. U.S. patent application Ser. No. 10/172,378 is a continuation-in-part of the following applications: U.S. patent application Ser. No. 09/298,417 entitled "Methods for Processing a Group of Accounts Corresponding to Different Products," filed on Apr. 23, 1999; U.S. patent application Ser. No. 09/298,505 entitled "Method for Linking Accounts Corresponding to Different Products Together to Create a Group," filed on Apr. 23, 1999; and U.S. patent application Ser. No. 09/298,521 entitled "Method for Defining a Relationship Between an Account and a Group," filed on Apr. 23, 1999. U.S. patent application Ser. Nos. 09/298,417, 09/298,505 and 09/298,521 claim priority from U.S. Provisional Patent Application No. 60/083,004 entitled "Methods and System for a Family Financial Services Card," filed Apr. 24, 1998. The aforementioned patent applications are commonly assigned with the present application to First Data Corporation.

The application is further related to U.S. patent application Ser. No. 10/371,852 entitled "Chasing Rewards Associated With Accounts," and filed on Feb. 22, 2003; U.S. patent application Ser. No. 10/319,422 entitled "Authorizing Transactions Associated With Accounts," and filed on Dec. 12, 2002; and U.S. patent application Ser. No. 10/373,637 entitled "Systems and Method for Authorizing Transactions," and filed on Feb. 24, 2003. All of the aforementioned patent applications are assigned to the assignee of the present invention, and the entirety of each of the aforementioned applications is incorporated herein by reference for all purposes.

BACKGROUND OF THE INVENTION

The present invention relates to rewards associated with accounts. More particularly, the present invention provides systems and methods for performing reward redemptions.

Rewards may be accrued in association with various accounts. For example, frequent flyer miles may be accrued in association with a credit card account, and based on activity in the credit card account. These frequent flyer miles may then be exchanged by the owner of the credit card account for travel. However, in general, the frequent flyer miles may not be exchanged by another individual unrelated to the credit card account.

As another example, such frequent flyer miles can be donated to a charitable organization, such as, the Make-a-Wish™ foundation. These miles can then be used by someone other than the owner of the credit card account. However, the frequent flyer miles can no longer be used by the account owner as they are no longer associated with the account, but rather convert to the charitable organization.

As yet another example, value exchangeable for merchandise can be accrued in relation to another credit card account. This can become problematic as this value remains a liability on the books of an issuer of the credit card account. Further, existing mechanisms for controlling or reducing this liability by forcing redemption of the value are cumbersome, and unfriendly to an account owner. In addition, the forced redemption often involves direct intervention by the entity maintaining the account. This increases the costs of account maintenance.

Thus, there exists a need in the art to address the various problems outlined above. As will be appreciated from the following disclosure, the systems and methods according to the present invention address these, and a number of other problems related to accruing and redeeming rewards.

BRIEF SUMMARY OF THE INVENTION

Among other things, the present invention provides systems and methods for fulfilling reward redemptions. As such, the present invention provides systems and methods for accruing and/or redeeming various rewards.

In some cases, the systems and methods include receiving redemption requests associated with an account. The redemption request can be satisfied from a reward associated with the account, by accessing a reward associated with another account, and/or by accessing a reward pool associated with a group of accounts. Redeeming a reward from another account can involve grouping the related accounts and allowing members of the group to perform the settlement function, or by transferring value between accounts and thereby providing a standard reward settlement mechanism. Various of the systems and methods further provide for performing automatic reward redemptions, either by an entity maintaining the account to which the reward is associated, or through use of a fulfillment entity.

Such reward redemptions can include redeeming rewards accrued in relation to account(s) based on activity of one or more parties associated with the account(s). These rewards can include point based rewards and/or cash based rewards. Such rewards can include, but are not limited to, frequent flyer miles, travel vouchers, travel certificates, travel tickets, reduced interest rates, value exchangeable at a particular retailer or group of retailers, cell phone minutes, mobile commerce value, sick days, vacation days, cash value rewards, and the like. Indeed, based on the disclosure provided herein, one of ordinary skill in the art will recognize a myriad of account types and reward types to which the present invention may be applied. For example, the accounts can be financial accounts, employee accounts, travel accounts, and/or other accounts associated with accruing rewards. Thus, as one example, the account can be a credit card account that accrues frequent flyer miles based on purchases applied to the credit card account.

One particular embodiment of the present invention provides methods for accruing frequent flyer rewards held in an airline account or under contract with an airline. The methods include providing an account associated with a frequent flyer reward that is augmented based at least in part on activity of a party. A request is received to associate another party with the account, and this added party is associated with the account. Upon association, the frequent flyer reward accrues based at least in part on activity of the added party. The methods further include receiving one or more requests to redeem the frequent flyer reward. In some instances, activity by either or both of the parties associated with the account can augment the frequent flyer reward. Such activity can include, for example, travel and/or use of a credit card.

Another embodiment of the present invention provides methods for acquiring frequent flyer rewards. The methods include providing at least two accounts that are each associated with frequent flyer rewards. Each account accrues a frequent flyer reward based on activity of the party or parties associated with the respective accounts. The methods further include associating the two accounts such that a combination of the frequent flyer rewards from the respective accounts is accessible by a party associated with one of the accounts. In some instances, the method includes aggregating the frequent flyer reward from one account with the frequent flyer reward from the other account in a reward pool. As such, the reward pool can be linked with either one of the accounts, or with an account group in which the accounts are associated.

In some instances, the methods further include reception of a reward redemption request from a party associated with one of the accounts. This redemption request can be satisfied using the reward associated with the account with which the party is associated. Alternatively, where the redemption request requires an amount greater than the reward associated with the account to which the party is associated, the redemption request can be satisfied using the reward pool, or an account in the account group other than that which the party is associated.

In yet other embodiments, methods for redeeming rewards are provided. Such methods include receiving a reward redemption request that indicates the type of reward to be redeemed. An account that accrues that type of reward is identified, and a reward of the indicated type is accessed to at least partially satisfy the reward redemption request. Thus, as just one of many examples, a reward redemption request for a plane ticket obtainable using frequent flyer miles is received. Based on this redemption request, one or more accounts that accrue such frequent flyer miles is accessed. A portion of the frequent flyer miles from these one or more accounts are deducted from these account and used to satisfy the redemption request.

Of note, the reward redemption request is not necessarily associated with any of the accounts from which the rewards are obtained. In particular cases, the redemption request is received in relation to an account associated with an account group, and the accounts from which the reward is deducted are also associated with the account group. In such cases, settlement of the reward transfer can be handled privately between members of the account group. In another instance, no settlement is provided, rather an open sharing system is implemented. Alternatively, in other cases, the account to which the redemption request is related is not related to the account(s) from which the reward is deducted. In such cases, a public settlement mechanism may be utilized to transfer value for the reward from one account to another. As just some examples, the accounts can be sick days accounts maintained with an employer or insurance company, vacation days accounts maintained with an employer, financial accounts associated with one or more financial products, and the like.

In a particular instance, the identified account is a first account, the reward associated with the first account is a first reward, and the reward redemption request is associated with a second account. In such cases, a reward associated with the second account can also be accessed to at least partially satisfy the reward redemption request where the second reward is associated with the second account. In another instance, the identified account is a first account and the reward redemption request is associated with a second account. As such, the methods can further include converting the reward associated with the first account to a common value, and transferring the common value from the second account to the first account. In some cases, a certain type of reward can be shared, while another type of reward is not shared. As just one example, all frequent flyer miles might be shared, while cash back bonuses are not shared.

In yet other cases, the identified account is a first account, the reward type is a first reward type, and the reward redemption request is associated with a second account that accrues a second reward type. In such cases, the methods can further include converting the reward of the first reward type to a common value, converting a reward of the second reward type to the common value, and transferring the common value from the second account to the first account.

In further embodiments, other methods for redeeming rewards are provided. Such methods include receiving a reward redemption request associated with an account that includes a reward amount. It is determined that the reward amount is greater than a reward associated with the account. The reward redemption request is then pended, or stored in a pending state until a later event allows for the reward redemption request to be satisfied.

In some cases, the reward redemption request remains pending until the reward associated with the account is augmented and becomes larger than that required to satisfy the redemption request. In other instances, the reward associated with the account is augmented and, while still less than that required by the redemption request, is within a predefined amount of the redemption request, thus allowing the redemption request to be satisfied on credit.

Alternatively, a reward accrual velocity, or the rate at which the reward has been augmented over some period, can be calculated. This reward accrual velocity can be used to calculate a point in time where the reward will be sufficient to satisfy the reward redemption request. Where the future date is within a predefined period, the reward redemption request can be satisfied on credit. Thus, for example, where a sufficient reward will be accrued within the next month, the redemption request can be satisfied immediately and the deficit portion of the reward deducted from the account over the succeeding month(s).

Thus, in some instances, the methods further include determining that the reward amount is less than the reward associated with the account, and satisfying the reward redemption request, while in other instances, the methods include determining that the reward amount is within a predefined amount of the reward associated with the account, and satisfying the reward redemption request. The predefined amount can be a reward amount, a time period, or the like.

In some cases, the reward associated with the account is augmented based at least in part on activity in the account. Further, in various instances, the account is a first account, the reward is a first reward, the first account and a second account are associated in an account group, a second reward associated with the second account is combined with the first reward in a reward pool, and determining that the reward amount is greater than the reward associated with the first account further includes determining that the reward amount is greater than a reward available from a reward pool.

Yet other reward redemption embodiments provide for receiving a reward redemption request that includes a reward amount. The methods further include identifying an account group to which the reward redemption request applies. The identified account group includes at least two accounts. It is determined that the reward amount is greater than an accrued reward accessible via the account group, and the reward redemption request is pended. In some cases, a pended redemption request causes a reduction in the amount of reward that can be allocated to a future redemption request.

As one particular example, a request for ten-thousand miles may be pended. In such a case, a future request for thirty-thousand miles may be denied and not pended as the amount of reward that would remain pended would surpass a pre-defined threshold.

In yet other embodiments of the present invention, methods for redeeming rewards are provided that include monitoring activity associated with an account. A reward associated with the account is augmented based at least in part on the monitored activity. Once it is determined that the augmented reward has achieved a defined level, the reward is automatically redeemed. In some instances, these methods further include providing an indication to a party associated with the account that the defined reward level is achieved, directing the party to an Internet web page, and presenting a group of options for redeeming the reward. In other instances, a regular letter can be sent. Based on this, one of ordinary skill in the art will recognize locations other than the Internet, or in addition to the Internet, to which the party may be directed to complete a redemption. For example, the party may directed to an interactive voice response (IVR) system, or other automated redemption system.

The methods can further include receiving an indication of an option selected by the party, and providing the selected option to the party. Such options can include, but are not limited to, cell phone minutes, mobile commerce value, merchandise, reduced interest rates, cash back, and travel rewards. Thus, for example, where mobile commerce value is selected by the party, providing the option can include uploading mobile commerce value to mobile commerce device maintained by the party. The party can then use the mobile commerce value that was uploaded. The party can, for example, make purchases at a mobile commerce enabled vending machine, or the like.

Various instances include identifying an accrued reward, and the identified party associated with the account to a fulfillment entity. It is also indicated that the fulfillment entity provided compensation for the accrued reward to the party associated with the account, and the amount of the compensation is deducted from the accrued reward. In some cases, the fulfillment entity is a retailer, or group of retailers, providing merchandise in exchange for the accrued reward. In such cases, the retailer(s) can provide all of the reward processing thus limiting the burden on an issuer maintaining the account. To this end, the fulfillment entity may further, provide an indication to the party associated with the account that the defined reward level is achieved, direct the party to a fulfillment mechanism, and present a group of options for redeeming the reward.

This summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
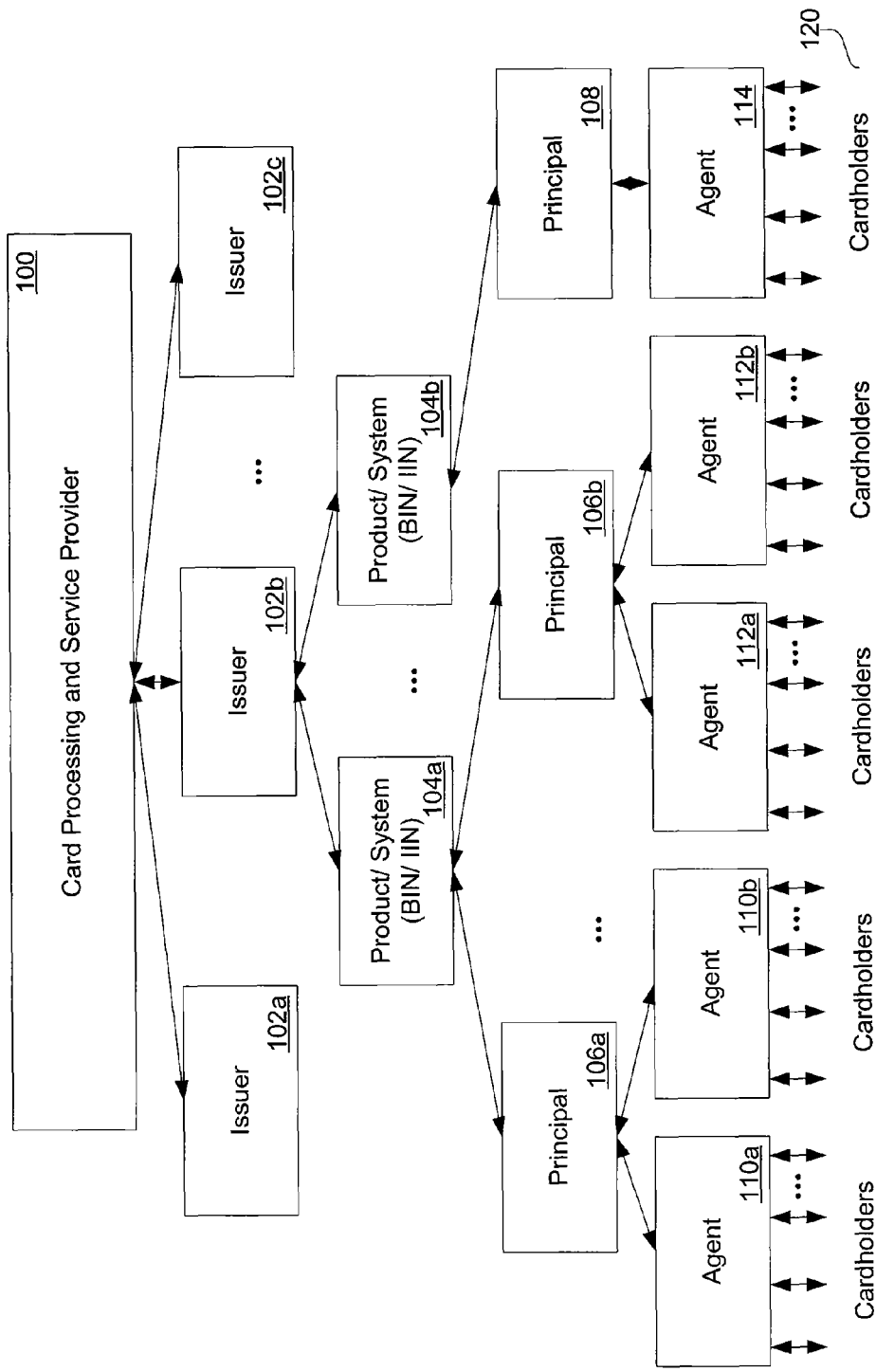
FIG. 1 is a block diagram illustrating an exemplary relationship between a card processing and service provider, issuers and cardholders.

Among other things, the present invention is directed to systems and methods for facilitating the redemption of rewards. In some cases, such rewards are associated with accounts including, but not limited to, financial accounts, incentive accounts, employee accounts, insurance accounts, and the like. Further, such rewards can include, but are not limited to frequent flyer miles, travel vouchers, travel certificates, travel tickets, reduced interest rates, value exchangeable at a particular retailer or group of retailers, cell phone minutes, mobile commerce value, sick days, vacation days, reduced interest rates, and the like. The present invention further addresses issues related to pending rewards, accessing rewards from related and unrelated accounts and/or account groups, automatic reward fulfillment, public and private settlement of reward exchanges, and associating parties and/or accounts to facilitate reward accrual and/or redemption.

Yet further, aspects of the present invention are directed at systems and methods for for linking accounts corresponding to different products together to create a group so that group processing can be performed at the group level while independent processing of the accounts is performed at the account level. The accounts in a group can span multiple products. A typical group includes a key account and one or more dependent accounts. Each group has a primary owner. Generally the primary owner corresponds to a cardholder for the key account.

Some of the methods include forming account groups and utilizing various redemption, fulfillment, and/or chasing ideas in relation to the account groups. Such methods can include linking the accounts into a group by linking a financial record for each account to group master data for the group. The group master data includes information about the group and the group members, including group control settings, group aggregate data, and a group identifier. The financial records include information about the corresponding account, a relationship parameter specifying whether the corresponding account is a key account or a dependent account, and if the financial record corresponds to a dependent account, a dependent strategy identifier.

The relationship between a dependent account and the group is specified by a dependent strategy. A dependent strategy specifies group processing options for the dependent account. The relationship between a dependent account and the group can be changed by selecting a new dependent strategy.

The detailed description which follows is represented largely in terms of processes and symbolic representations of operations by a conventional computer. The processes and operations performed by the computer, in both a stand alone environment and a distributed computing environment, include the manipulation of signals by a processor and the maintenance of these signals within a data set, such as a database and a data structure. Each of these data sets and data structures are resident in one or more memory storage devices. Basically, a data set is a collection of related information in separate elements that are manipulated as a unit. A data structure is a structured organizational scheme that encapsulates data in order to support data interpretation and data operations. The data structure imposes a physical organization upon the collection of data stored within a memory storage device and represents specific electrical or magnetic elements.

For the purposes of this discussion, a method or process is generally conceived to be a sequence of computer executed steps leading to a desired result. These steps generally require physical manipulations of physical quantities. In addition, it should be understood that the methods and systems described herein are not related or limited to any particular computer (standalone or distributed) or apparatus. Furthermore, the methods and systems are not related or limited to any particular communication architecture. Thus, one skilled in the art will be able to implement the systems and methods of the present invention with general purpose machines or specially customized programmable devices according to the teachings described herein.

Referring now to the drawings, in which like numerals represent like elements throughout the several figures, aspects of the present invention and the preferred operating environment are described.

Card Processing and Service Provider, Issuers, and Cardholders

The processing of a credit card transaction typically involves the cardholder, a merchant, a merchant acquirer, the card issuer, and a card processing and service provider. FIG. 1 illustrates an exemplary relationship between a card processing and service provider 100, a number of issuers 102a, 102b . . . 102c, and a number of cardholders 120. The card processing and service provider 100 supports the issuers by authorizing and processing monetary transactions, as well as providing support for creating new accounts, modifying accounts, generating cardholder statements, applying payments to accounts, controlling communications to cardholders and building reward programs. An issuer, such as, issuer 102b, is typically a bank or other financial institution that issues one or more credit card products. The issuer manages transaction processing at the account level. An issuer typically manages a number of accounts using a hierarchy, such as the Product/System, Principal, and Agent hierarchy shown in FIG. 1. The cardholders 120 are typically individuals holding a credit card or charge card, such as a VISA™, MASTERCARD™, or private label card. In addition to the elements shown in FIG. 1, additional elements (not shown) may also be included. For example, additional issuers, Products/Systems, Principals, and Agents may exist.

An issuer can issue different types and versions of credit card products. For example, issuer 102b could offer a VISA™ product and a MASTERCARD™ product. Each product could be offered in standard, gold and platinum versions. The Product/System blocks shown in FIG. 1 correspond to different products. If issuer 102b issues a VISA™ product and a MASTERCARD™ product, then Product/System 104a could correspond to the VISA™ product and Product/System 104b could correspond to the MASTERCARD™ product. An issuer typically uses either a BIN (bank identification number) or an IIN (issuer identification number) to identify its different credit card products.

Issuers typically use additional levels of reporting structures below the Product/System level to manage large portfolios. FIG. 1 illustrates that below the Product/System level is the Principal level and below the Principal level is the Agent level. The divisions between the Principal level and the Agent level are typically defined by the issuer. Some issuers use the Principal level and the Agent level to make geographical divisions. For example, Principal block 106a could correspond to a geographic region, such as the southeast, and Agent block 110a could correspond to a state within that region. The cardholders 120 are located below the Agent level. As shown in FIG. 1, a number of cardholders can be associated with a single Agent. FIG. 1 illustrates an example of the hierarchical relationships that exist between an issuer and a cardholder. As will be apparent to those skilled in the art, alternative hierarchies are also possible.

An individual can hold a number of different cards corresponding to a number of different accounts. Although the same cardholder is associated with each of the accounts, each account is processed independently by the issuer. If several cardholders are in the same family, then each cardholder may hold several cards. In the case of a family, the cardholders may be related and the payments may be made from family funds, but each account is still processed independently. For example, Table 1 illustrates the credit cards held by a typical family including friends and co-workers.

TABLE 1

| Cardholder | STANDARD VISA™ | STANDARD MC | GOLD MC | VACATION DAYS | SICK DAYS | INSURANCE BENEFITS |
|---|---|---|---|---|---|---|
| MOTHER | Account 1 | | Account 2 | Account 7 | Account 9 | Account 11 |
| FATHER | | | Account 3 | | | Account 12 |
| SON | Account 5 | | | | | |
| DAUGHTER | | Account 6 | | | | |
| GRANDFATHER | | Account 8 | | | | |
| FRIEND | | | | | | Account 13 |
| CO-WORKER | | | | Account 14 | Account 10 | |

Each of the accounts shown in Table 1 is an independent account from the perspective of the entity maintaining the account, whether it be an issuer, an insurance provider, an employer, or the like. Thus, for example, the standard MASTERCARD™ account associated with the daughter (Account 6) is independent of the standard MASTERCARD™ account associated with the grandfather (Account 8) and the gold MASTERCARD™ account associated with the mother (Account 2) is independent of the gold MASTERCARD™ account associated with the father (Account 3). As illustrated, various accounts can be grouped including, but not limited to, financial accounts associated with one or more financial products, insurance benefit accounts, employer benefit accounts, and the like. Based on the disclosure provided herein, one of ordinary skill in the art will recognize a myriad of other account types that can also be included in a group, or otherwise used in relationship with the inventions disclosed herein. For example, a reward account, such as a frequent flyer miles account associated with one or more travel providers could be used in relation to the present inventions. The processing options used by the issuer to process the accounts shown in Table 1 can differ by product.

Figure 2:
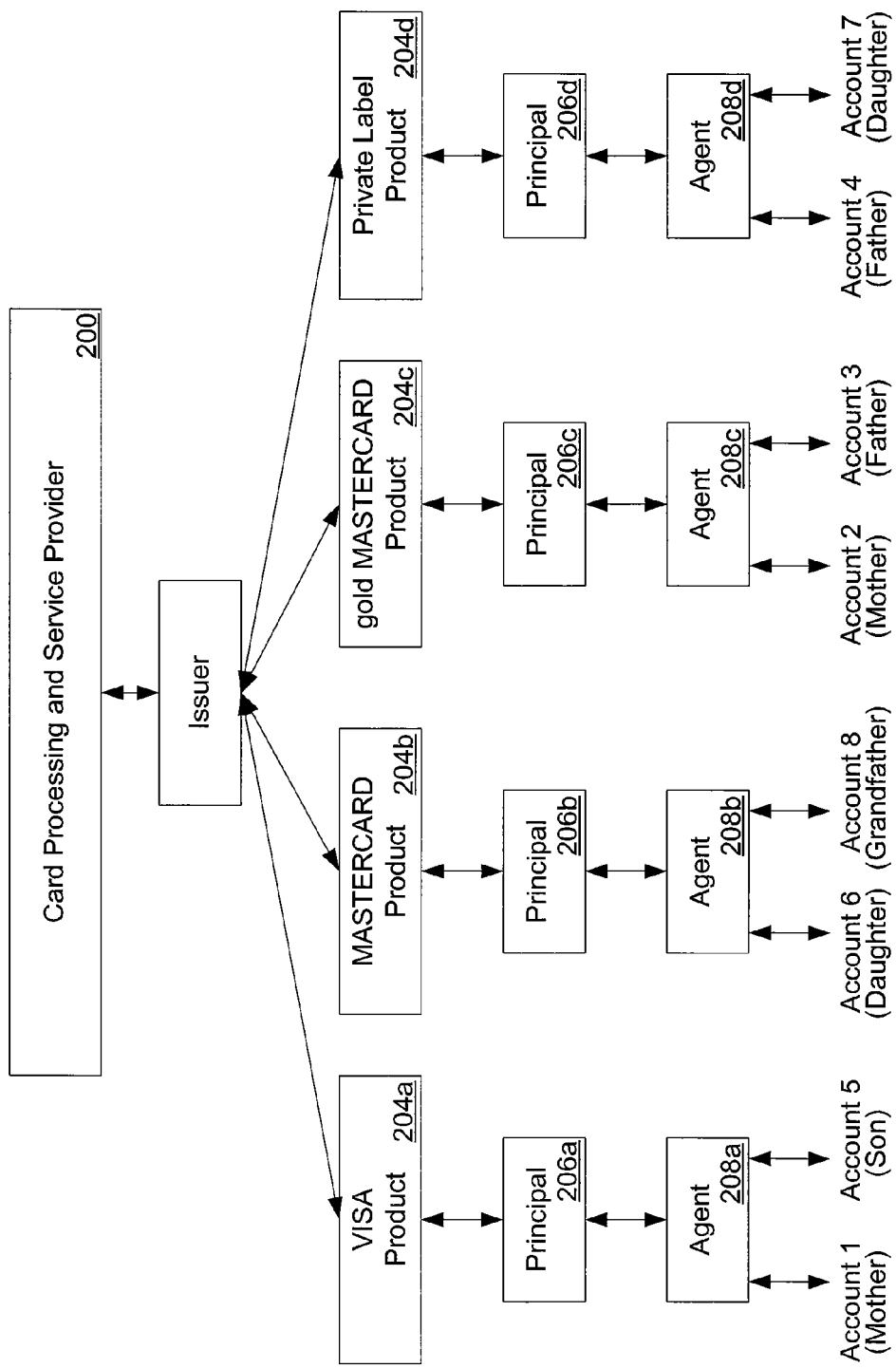
FIG. 2 is a block diagram illustrating an exemplary relationship between a card processing and service provider, an issuer and the cardholders within a group in accordance with an embodiment of the present invention.

The relationships between the different accounts shown in Table 1, the issuer, and the card processing and service provider are illustrated by FIG. 2. The card processing and service provider 200 supports the issuer 202. The issuer 202 issues a variety of credit card products, including a standard VISA™ product 204a, a standard MASTERCARD™ product 204b, a gold MASTERCARD™ product 204c, and a private label product 204d. Account 1 and Account 5 are shown under the standard VISA™ product 204a, Account 6 and Account 8 are shown under the standard MASTERCARD™ product 204b, Account 2 and Account 3 are shown under the gold MASTERCARD™ product 204c, and Account 4 and Account 7 are shown under the private label product 204d.

Groups and Group Relationships

In accordance with an embodiment of the present invention, the accounts shown in Table 1 and FIG. 2 can be linked together to create a group. A group can include a number of accounts that correspond to a single issuer. By linking accounts into a group, group processing can be performed on the accounts that are members of the group while maintaining independent processing of each of the accounts. Each group has a primary owner. Generally the primary owner corresponds to a cardholder for a key account. For example, the standard VISA™ account held by the mother could be designated as the key account for the group shown in Table 1 and FIG. 2. The remaining accounts in the group are referred to as dependent accounts. The relationship between a dependent account and the group is independent of the relationship between the remaining dependent accounts and the group. Typically, the issuer defines the possible relationships between a dependent account and the group.

FIG. 2 shows one possible organization for a group. Other organizations are also possible. As shown in FIG. 2, the accounts in a group can be associated with different products. There are no restrictions on the placement of the accounts in a group at the Product/System, Principal or Agent levels. The accounts in a group can be split between different Products/Systems, Principals and Agents. The key account and a dependent account can be associated with the same Agent. Multiple dependent accounts can also be associated with the same Agent. The accounts associated with an Agent are not required to be in the same group (or any group at all).

Figure 3:
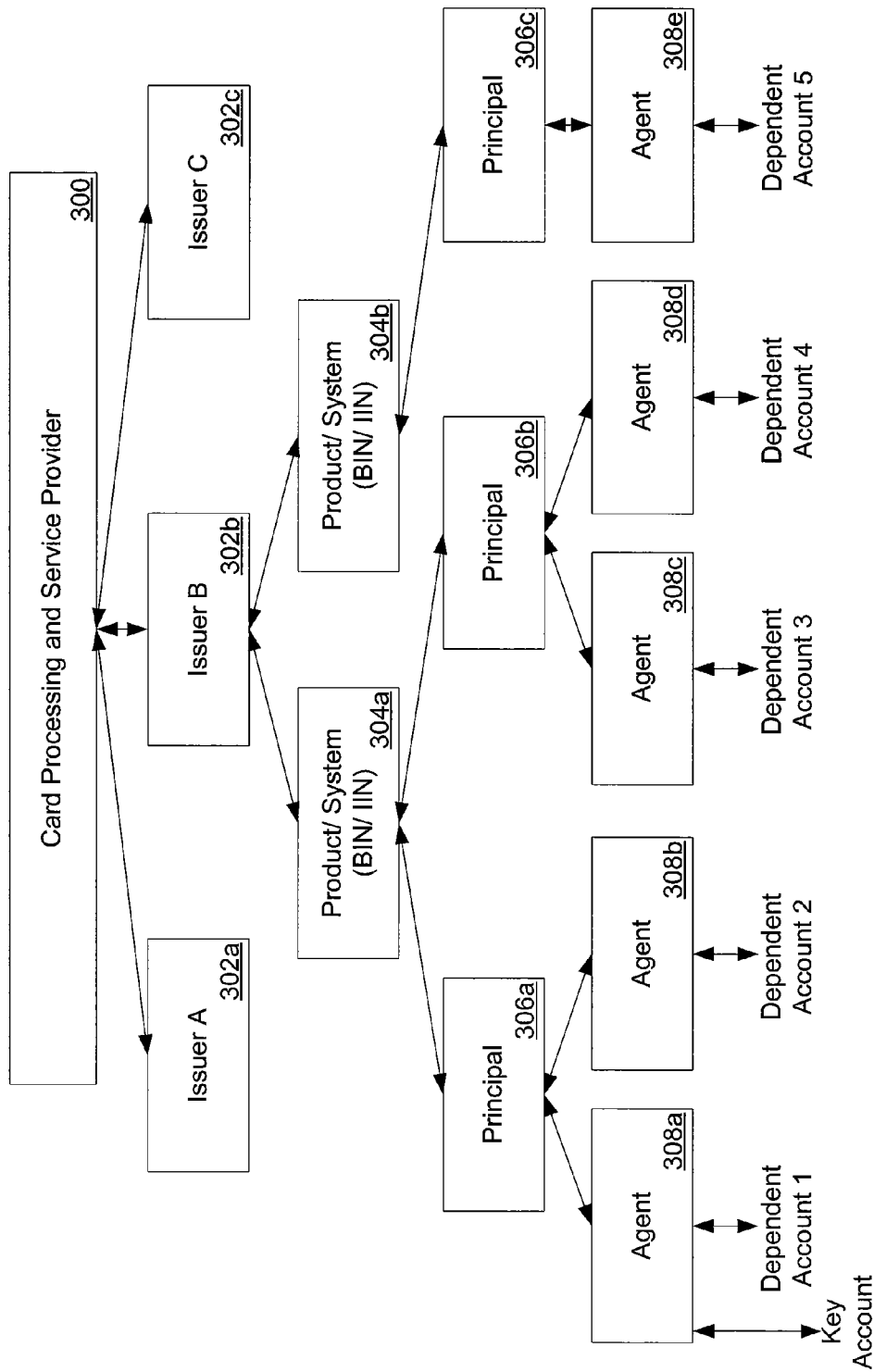
FIG. 3 is a block diagram illustrating the relationship between a card processing and service provider, issuers and the cardholders within a group in accordance with an embodiment of the present invention.

FIG. 3 shows an exemplary group where the key account and Dependent Account 1 are associated with the same Agent 308a. Dependent Account 2 is associated with a different Agent 308b, but is the same type of product 304a as the key account and Dependent Account 1. Dependent Account 3 is associated with a different Principal 306b than the key account, Dependent Account 1, and Dependent Account 2, but is the same type of product 304a. Dependent Account 4 is associated with a different Agent 308d than Dependent Account 3, but is associated with the same Principal 306b. Dependent Account 5 is a different product 304b than any of the other accounts in the group. Although FIG. 3 only shows a single group, additional groups or individual accounts can exist under the issuer 302b. Furthermore, additional groups can exist under the other issuers 302a, 302c.

Figure 4A:
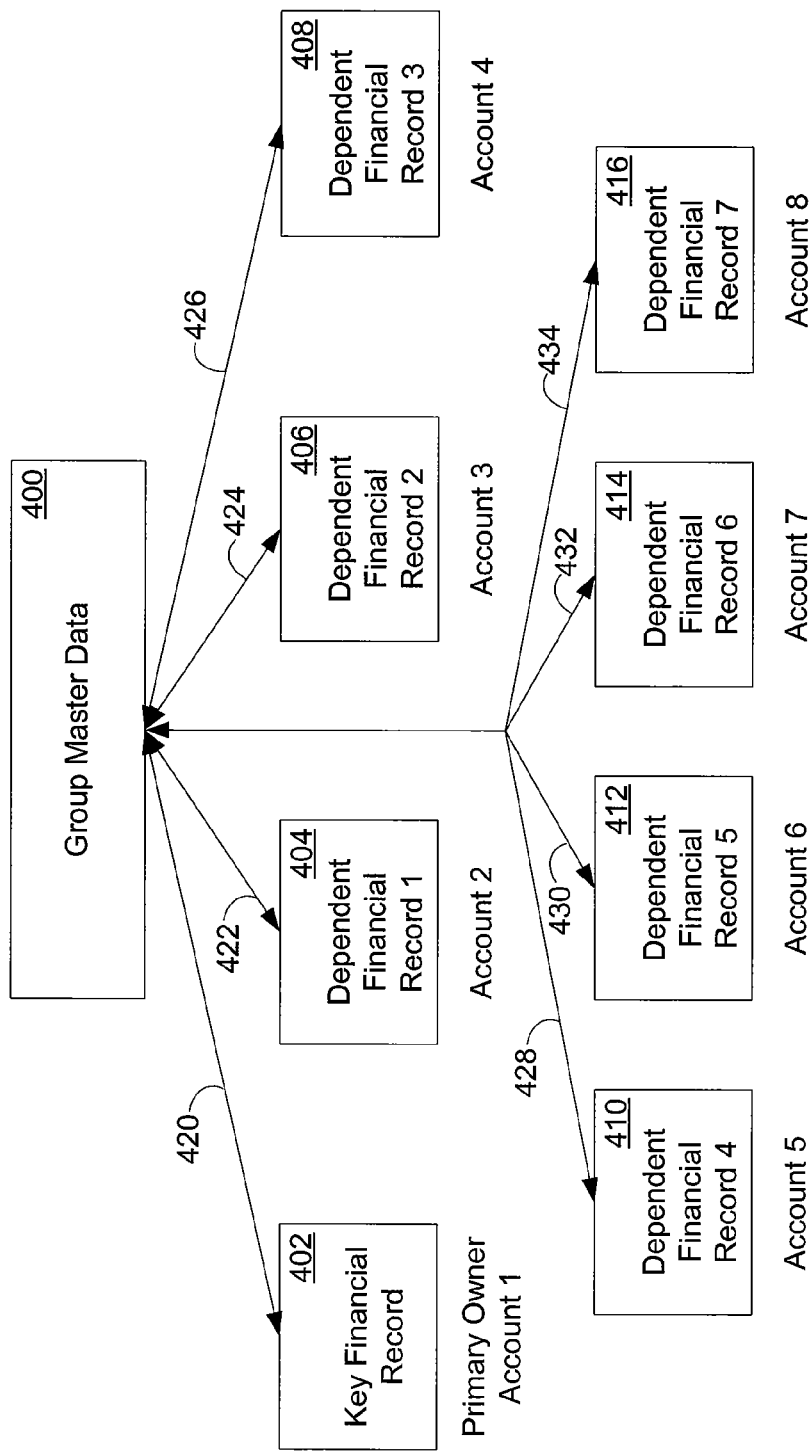
FIG. 4A is a block diagram illustrating the files included in the group master data in accordance with an embodiment of the present invention.

Linking the accounts into a group is accomplished by linking a financial record that corresponds to each account to group master data for the group. FIG. 4A illustrates the linking of the accounts shown in Table 1 into a group. The Group Master Data 400 includes information about the group, including group control settings, group aggregate data, and a group identifier. The Group Master Data 400 is discussed in more detail below in connection with FIG. 4B. The Key Financial Record 402 corresponds to the key or primary owner. The Key Financial Record 402 can also correspond to a key account held by the primary owner. In this example, the Key Financial Record 402 corresponds to the standard VISA™ account held by the mother. The relationship 420 between the Key Financial Record 402 and the Group Master Data 400 is a predefined relationship. Typically, the relationship is defined in part by the card processing and service provider and in part by the issuer.

In addition to the Key Financial Record, the group also includes Dependent Financial Records 404, 406, 408, 410, 412, 414, and 416 that correspond to the dependent accounts. Typically, a dependent account is associated with each dependent financial record. For example, Account 2 is associated with Dependent Financial Record 1 404. Each account is also associated with one or more cardholders, e.g. the mother is the cardholder associated with Account 2.

The dependent accounts in the group can cross product lines. In this example, Account 2 and Account 3 are MASTERCARD™ products, Account 4 and Account 7 are private label products, Account 5 is a VISA™ product, and Account 6 and Account 8 are MASTERCARD™ products. The relationship 422 between Dependent Financial Record 1 404 and the Group Master Data 400 is independent of the relationship between the remaining Dependent Financial Records and the Group Master Data.

The dependent accounts can also have different types of ownership. For example, the primary owner and a dependent cardholder can be jointly responsible for a dependent account, the primary owner can be responsible for a dependent account where a dependent cardholder is an authorized user, or a dependent cardholder can be solely responsible for a dependent account. In addition, a dependent cardholder can be jointly liable with the primary owner for the group liability. If a dependent cardholder is jointly liable with the primary owner for the group, then the dependent account is a jointly liable dependent account.

Group Master Data

Figure 4B:
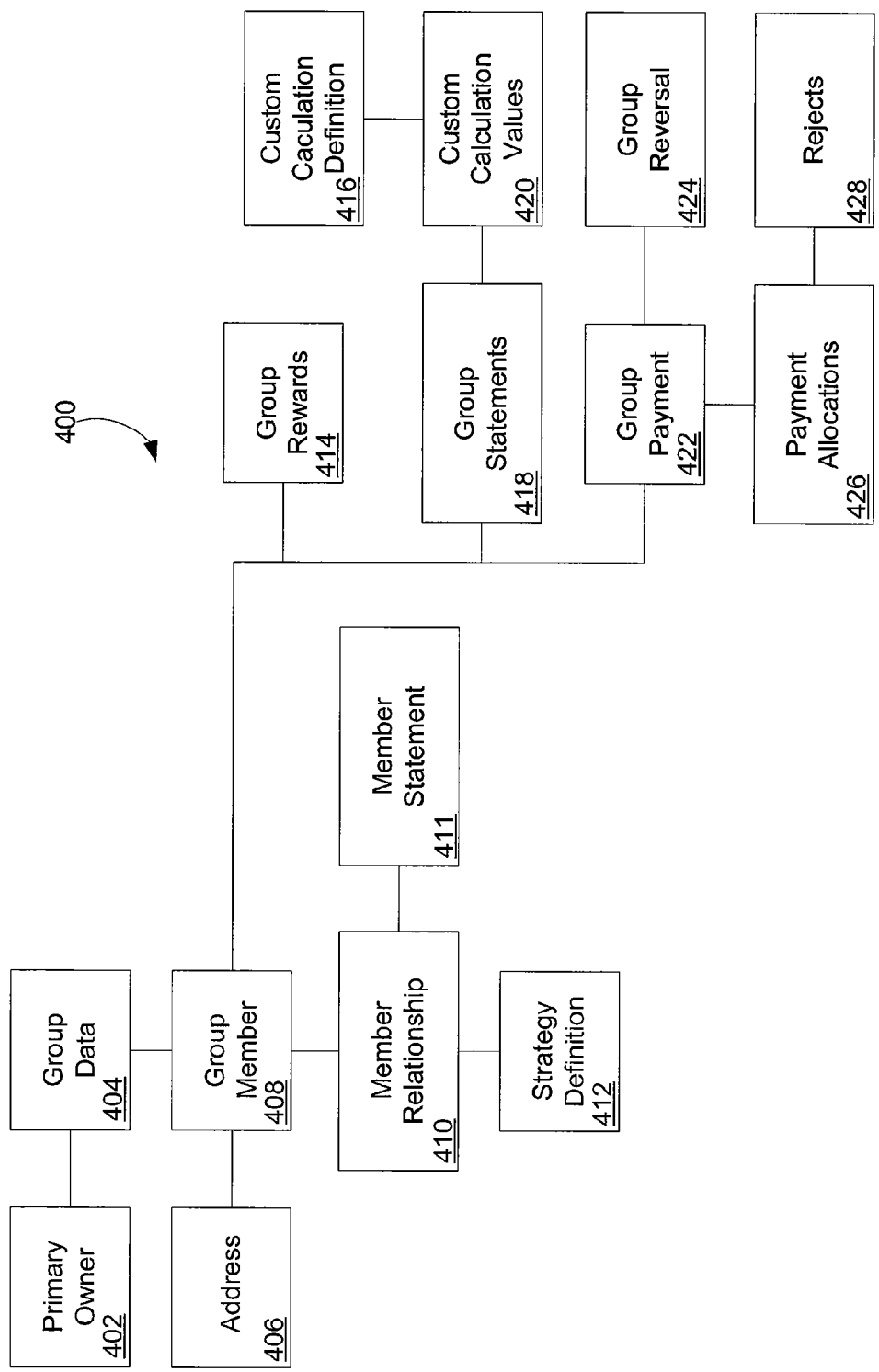
FIG. 4B is a block diagram illustrating group master data in accordance with an embodiment of the present invention.

The Group Master Data 400 is further illustrated in FIG. 4B. FIG. 4B illustrates a number of files 402-428. Each of the files includes records that contain information about the group and the accounts that are members of the group. The Group Data file 404 includes information about the group, such as a group identifier, a group cycle code, a group credit line, group available credit, and a group collector code. The group identifier identifies the group. Each of the records associated with the group includes the group identifier.

A group cycle code indicates the cycle code for the group. If the group includes a key account, then the cycle code for the key account typically is used as the group cycle code. If the group does not include a key account, then the group cycle code can be a default cycle code or can be based upon the cycle code of one of the dependent accounts in the group. The group credit line specifies the credit available for the accounts in the group that authorize against the group credit line. The group available credit specifies the current credit available for the accounts in the group that authorize against the group credit line. The group collector code may be set once a collector is assigned to one of the accounts in the group. A collector may be assigned because the account is delinquent. If another account in the group becomes delinquent, then the group collector code is checked and the same collector is assigned to that account if a group collection option is used.

The Primary Owner file 402 includes information about the primary owner of the group. The primary owner is the individual that is liable for the group. If more than one individual is liable for the group, then those individuals are jointly liable for the group and information about the individuals in stored in the Primary Owner file 402. For example, a primary owner and a dependent cardholder could be jointly liable for the group. For simplicity, the term "primary owner" is used herein to include a single primary owner or joint primary owners. Every group has a primary owner. If the group includes a key account, then the key cardholder is the primary owner.

The Group Member file 408 includes a record for each of the accounts that is (or was) a member of the group. Each record includes an account number, an indication as to whether the account is a key account or a dependent account, and group membership information. A record is maintained for an account in the Group Member file 408 even if the account is delinked from the group. Each record includes group membership information which indicates when the account was linked to the group and if the account is no longer a member of the group, when the account was delinked from the group. The Address file 406 includes a record for each of the accounts that is (or was) a member of the group. Each record includes the mailing address of the cardholder associated with the account.

The Member Relationship file 410 includes a record for each of the accounts that is (or was) a member of the group. A member relationship record contains information about the strategy associated with an account. If the strategy associated with the account has changed, then the member relationship record contains information about the previous strategy or strategies, as well as the current strategy. The member relationship record also contains information about the effective dates of each strategy.

The Strategy Definition file 412 includes a record for each of the defined strategies. The strategy definition records include the parameters and the parameter values that define the strategies referred to in the member relationship records. If the definition of a strategy has changed, then the strategy definition record for that strategy also includes the parameter and the parameter values that defined the previous version or versions of the strategy, as well as the effective dates of each strategy definition.

The Member Statement file 411 includes records for each account that is (or was) a member of the group. Each record includes a number of fields that store statement data (monetary information) for the associated account. In addition, each record includes a flag that indicates whether the associated account cycles with the group (i.e. has the same cycle code as the group) or cycles independently. The information stored in the Member Statement file 411 is used to generate the group statement, dependent cardholder statement, and/or a courtesy statement.

The Group Statement file 418 includes records that contain group monetary and group non monetary information. The group monetary information includes the group balances, as well as the group credit line and group available credit for a particular statement. The group non monetary information includes the group payment due date. Typically, the group payment due date is the earliest due date of all the accounts of the group that are paid by the primary owner. The information stored in the Group Statement file 418 is used to generate the group statement.

The information in the Member Statement file 411 and the Group Statement file 418 is used to determine the initial break up of a group payment. The information is also used to support the on line display of statement information to an operator.

The Group Rewards file 414 includes a record for each of the reward programs for the group. Each record includes information about the reward program, such as a reward program identifier and the amount of group points accumulated in that reward program.

The Custom Calculation Definition file 416 and the Custom Calculation Values file 420 support customized group calculations that appear in a field on the group statement. Each custom calculation definition record includes a formula for a customized group calculation. Typically, a formula specifies that a customized group calculation is calculated using monetary elements from the accounts in the group. The value that is calculated using the formula is stored in a custom calculation values record.

The Group Payment file 422 includes a record for each group payment received. Each record includes the amount of the group payment and the date the group payment was received. The Payment Allocations file 426 includes a record for each group payment received. Each record indicates how the group payment was allocated among the accounts in the group. The Group Reversal file 424 includes a record for each group payment that has been reversed. If a group payment is reversed, then the reversal is made by referencing the Payment Allocation file 426 to determine how the payment was originally allocated.

The Rejects file 428 includes records of rejections detected during processing other than group processing. A record in the Rejects file 428 includes a rejection report that provides details of the rejection. As will be apparent to those skilled in the art, the files shown in FIG. 4B are exemplary group master data files. The group master data could be stored using alternative types of files and records.

Dependent Strategies

Typically, the relationship shown in FIG. 4A between the Dependent Financial Records 422, 424, 426, 428, 430, 432, 434 and the Group Master Data 400 is defined by a set of parameters. The parameters are typically provided by the card processing and service provider. A set of parameters and parameter values can be selected to create a customized dependent strategy. Either the card processing and service provider or the issuer can select the parameters and the parameter values to create a dependent strategy. Preferably, the card processing and service provider provides parameters and the issuer selects a set of parameter values that is suitable for a particular situation. Alternatively, the card processing and service provider could provide strategies rather than parameters to define the strategies. If the card processing and service provider provides strategies, then each of the issuers supported by the card processing and service provider chooses among the same group of strategies. However, if the card processing and service provider provides parameters, then each issuer can customize the strategies offered to its customers. In some embodiments the dependent strategies are labeled. For example, a dependent strategy for a college-age child residing at school may have one label, whereas a dependent strategy for a second account for the primary owner may have another label.

A dependent strategy specifies the relationship between a dependent account and the group by specifying group processing options for the account. The group processing options provide flexibility in the relationships between the dependent accounts and the group and provide for automatic processing at the group level. Typically, the dependent strategy includes parameters that define how transactions are authorized for the dependent account, as well as whether payment for the account is due from the primary owner or from the dependent account cardholder. In addition the dependent strategy includes options for payment application, statement generation, cardholder communications, and reward pooling.

The parameter values could be selected to create a dependent strategy appropriate for a dependent, college age child that resides at school. The parameter values could be selected so that the child is liable for the account and the parent receives information about the activity of the account. Alternatively, the parameter values could be selected so that the parent and the child are jointly liable for the account and that both the parent and the child receive information about the activity of the account at their respective residences. Another strategy could be created for a high school age child living at home. The parameter values could be selected so that the primary owner, typically the parent, is financially liable for the account and the account has a predetermined limit. The primary owner could set the limit on the account.

The parameter values could also be selected to create a strategy for a dependent account held by the primary owner. The primary owner could use the key account and the dependent account to segregate expenses. The parameter values could be selected so that the primary owner is liable for the account and detailed information about the account is included on the group statement. As will be apparent to those skilled in the art, additional strategies can also be created to address the needs of other situations.

Creating a Group

There are a number of ways that a group can be created. One way to create a group is to create a group using new accounts. Another way to create a group is to link a number of existing accounts together. Typically, a group is created by an issuer. The group can be created using either on line or batch processing. Once the first account is identified as being a member of the group, the group master data is automatically generated. Once a group is created, additional accounts can be added to the group or existing accounts can be removed from the group.

Business rules are used to insure that the relationships between the accounts in the group are valid. The business rules define the types of accounts that can be linked together in a group. Typically, the business rules are promulgated by the card processing and service provider. The business rules are checked whenever group relationships are impacted. For example, the business rules are checked when a group is created or an account is added to or removed from a group. Shown below is a list of typical business rules. As will be apparent to those skilled in the art, the number and types of business rules may vary from that shown below.

(1) A group must have one and only one primary owner.
(2) A group will not exist without at least one account linked to it or a historical relationship to an account.
(3) Dependent accounts must have dependent strategies.
(4) All accounts that statement together must have the same cycle code and method.
(5) All accounts in the group must have the same issuer number.
(6) Accounts within a group cannot be dual. A dual account is an account that corresponds to two different credit card products. For example, a dual account could correspond to a VISA™ product and a MASTERCARD™ product.
(7) Accounts within a group cannot be included in a Combine Account Transfer. A Combine Account Transfer is a process that merges two accounts into a single joint account.
(8) Accounts in the group cannot have a commercial card relationship.
(9) The key account cannot have a status of bankrupt, closed or charge off without impacting the dependent accounts.

Creating a Group Using New Accounts

Figure 5:
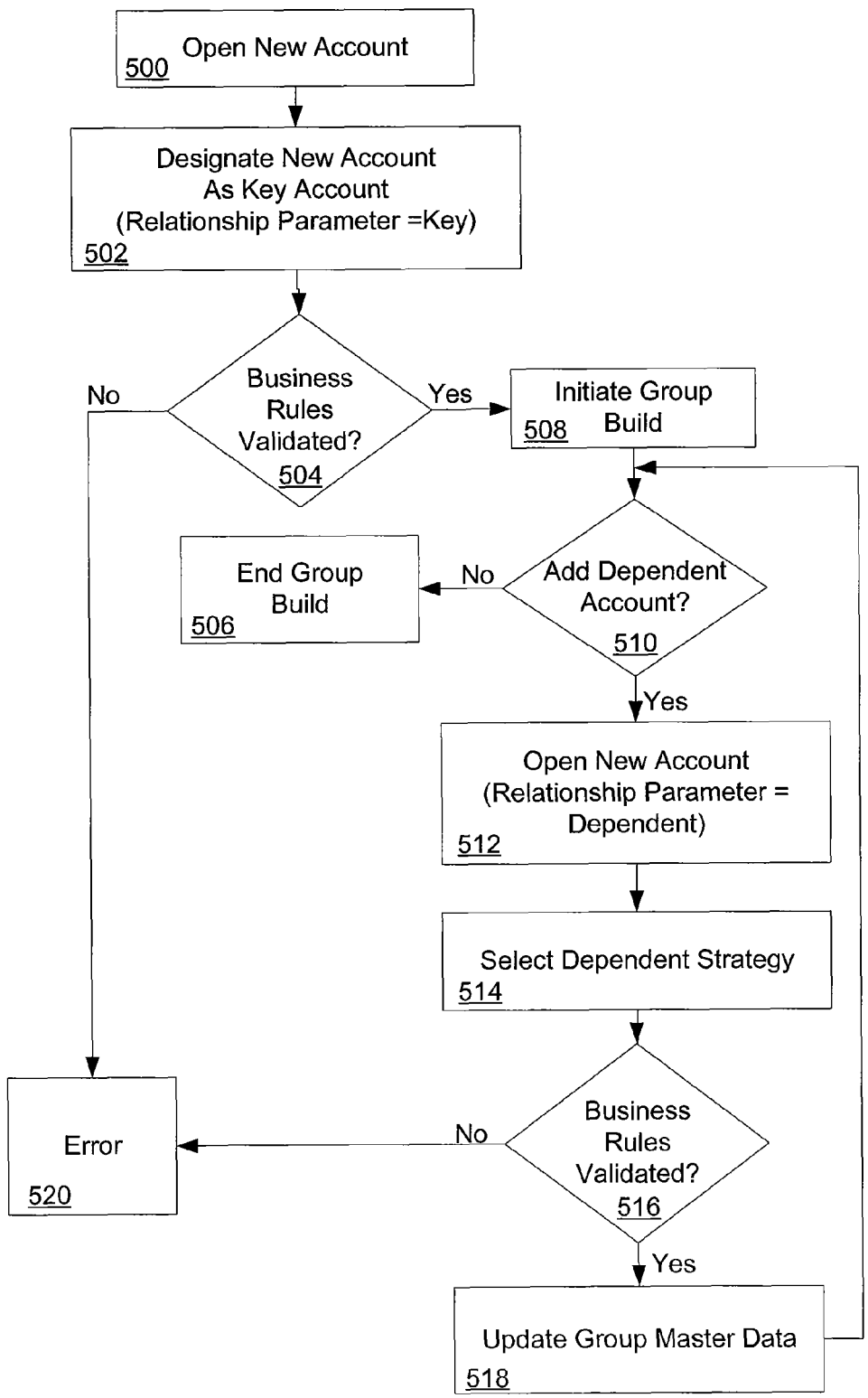
FIG. 5 is a flow diagram illustrating the steps for creating a group using new accounts in accordance with an embodiment of the present invention.

An exemplary method for creating a group using new accounts is shown in FIG. 5. In step 500, a new account is opened. The new account is designated as the key account in step 502 by setting a relationship parameter for the account to "key." The relationship parameter defines the relationship between the account and the group. When the key account is opened, a number of account parameters and group parameters are automatically set. For example, parameters defining the cycle code and method and the currency code are typically defined at the time the account is opened. In step 504, the parameters set in step 500 are compared to the set of business rules. If the parameters set in step 500 satisfy the business rules, then the business rules are validated.

If the determination in step 504 is that the business rules are validated, then the "Yes" branch is followed to step 508. In step 508, the group build is initiated and the key financial record and the group master data are created. Typically, the key financial record includes the account parameters for the key account plus the relationship parameter and a group identifier. The group master data includes a group identifier and certain group parameters. If the determination in step 504 is that the business rules are not validated, then the "No" branch is followed to step 520 and an error occurs.

Although FIG. 5 illustrates that a key account is created in steps 500 and 502, a group can be created without a key account. If a key account is created, then the key account cardholder is the primary owner. However, if a group is created without a key account, a primary owner is required. A key financial record is created regardless of whether the group includes a key account.

The remaining steps in FIG. 5 illustrate adding dependent accounts to the group. In step 510, a determination is made as to whether a dependent account is to be added to the group. If a dependent account is to be added to the group, then the "Yes" branch is followed to step 512 and a new account is opened. The new account is designated as a dependent account by setting the relationship parameter for the account to dependent. From step 512, the method proceeds to step 514 where a dependent strategy is selected. Typically, an issuer provides a number of dependent strategies that can be used for dependent accounts within a group. Once a dependent strategy is selected, then a determination is made in step 516 as to whether the parameters selected in opening the dependent account and the dependent strategy satisfy the business rules. If the business rules are satisfied, then the business rules are validated in step 516 and the method proceeds to step 518. In step 518, the dependent financial record is created and the group master data is updated. Typically, the dependent financial record includes account parameters for the dependent account, as well as the relationship parameter, a group identifier, and a dependent strategy identifier. Updating the group master data includes creating the link between the dependent financial record for the dependent account and the group master data.

From step 518 the method returns to step 510 and a determination is made as to whether another dependent account is to be added. If another dependent account is to be added, then steps 512, 514, 516, and 518 are repeated. Once all the dependent accounts have been added, then the method proceeds from step 510 via the "No" branch to step 506 and the method ends.

FIG. 5 illustrates that business rules are validated after the key account or a dependent account is opened. Alternatively, if the accounts are opened in an on line environment, then the business rules can be validated as the accounts are opened. For example, an operator can be prevented from creating an invalid relationship, such as creating two key accounts. FIG. 5 also illustrates that the group master data is updated after the addition of each dependent account. However, the group master data can be updated at other times. For example, information for opening a key account and dependent accounts may be collected by the issuer and then submitted by the issuer to the card processing and service provider in batch. If the information is submitted in batch, then the group master data may be updated once with information for all of the accounts in the group.

Creating a Group Using Existing Accounts

Figure 6:
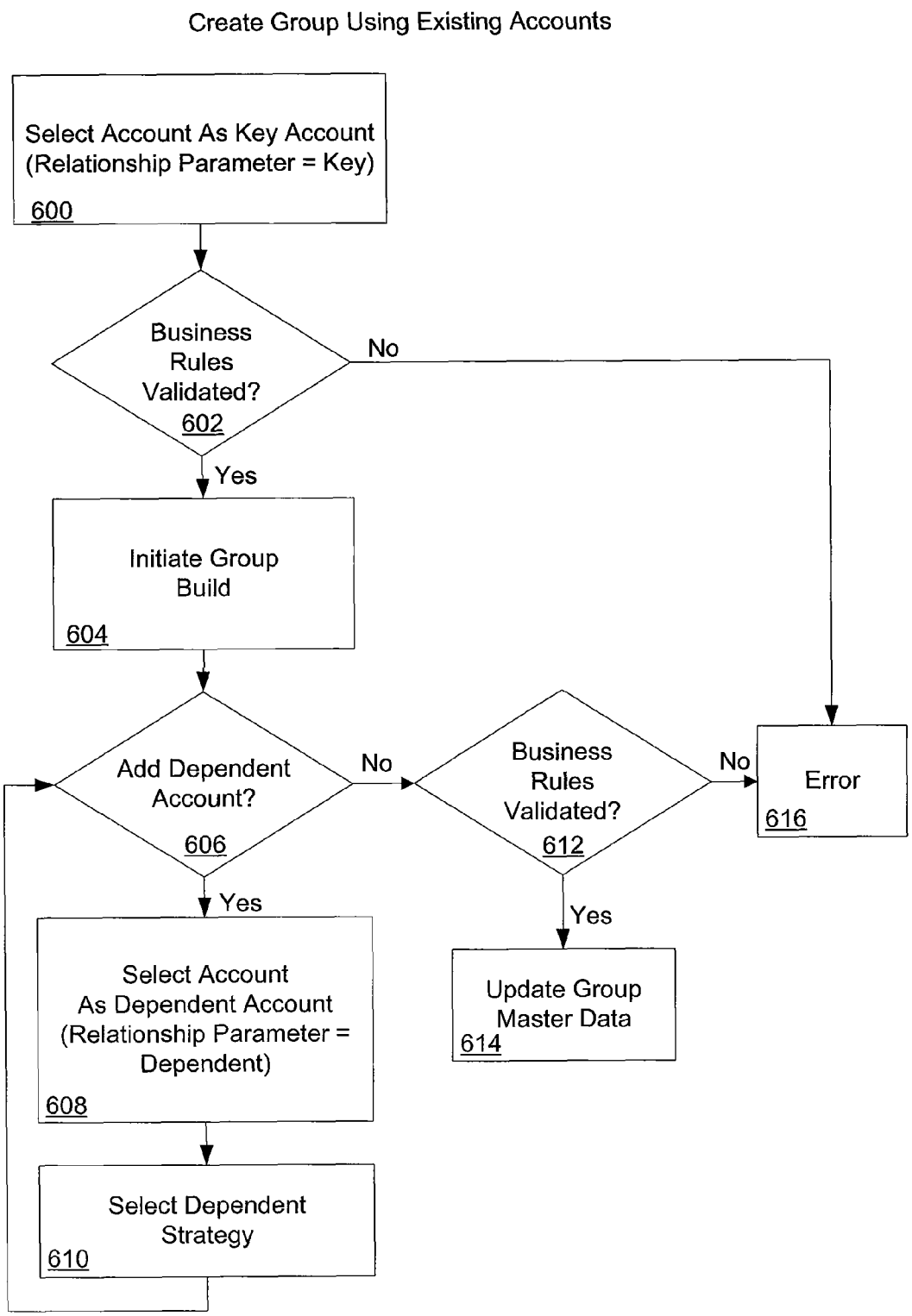
FIG. 6 is a flow diagram illustrating the steps for creating a group using existing accounts in accordance with an embodiment of the present invention.

FIG. 6 illustrates the steps for creating a group using existing accounts. In step 600, an existing account is selected as the key account by setting the relationship parameter for the account to key. If the account was not previously a member of a group, then the relationship parameter was blank. Once an existing account is selected as the key account, then in step 602 a determination is made as to whether the business rules are validated. The business rules are validated if the parameters for the key account satisfy the business rules.

If the business rules are validated, then the method follows the "Yes" branch to step 604. In step 604, the group build is initiated. Initiating the group build includes creating the group master data, and linking the key account to the group by linking the key financial record to the group master data.

Once the initial group build is complete, then a determination is made in step 606 as to whether a dependent account is to be added to the group. If a dependent account is to be added to the group, then the "Yes" branch is followed to step 608. In step 608, an account is selected as a dependent account. Once an account is selected as a dependent account, the relationship parameter for the selected account is set to dependent. In step 610, a dependent strategy is selected for the dependent account. From step 610 the method returns to step 606 and a determination is made as to whether another dependent account is to be added to the group.

Once all the dependent accounts have been added to the group, then the "No" branch is followed from step 606 to step 612. In step 612, a determination is made as to whether the business rules are validated. The business rules are validated in step 612, if the dependent accounts satisfy the business rules. If the business rules are validated in step 612, then the "Yes" branch is followed to step 614. In step 614, the group master data is updated with information for the dependent accounts. In addition, the dependent financial records for the dependent accounts are linked to the group master data. However, if the business rules are not validated in step 612, then the "No" branch is followed to step 616 and an error occurs.

Although FIG. 6 illustrates that the group master data is updated after all the dependent accounts have been selected, those skilled in the art will appreciate that the group master data could be updated at other points in the process. For example, if the group is being created using on line processing, then validating the business rules and updating the group master data could occur after step 610 for each dependent account added.

Changing Group Relationships

The relationships between the accounts of the group are flexible and can be modified. The relationship between a dependent account and the group can be changed by selecting a new dependent strategy. The ability to modify, the dependent strategy allows the account to change as the cardholder's situation changes. For example, if the initial dependent strategy was a strategy suitable for a high school age child living at home, then the dependent strategy could be modified to a strategy suitable for a college age child living at school once the child enters college and moves away from home. Changing the dependent strategy of one of the dependent accounts does not impact the dependent strategies of the other dependent accounts.

In addition, a dependent account can be added to the group or deleted from the group without affecting the remaining accounts in the group. The ability to add dependent accounts and delete dependent accounts allows the group to change to accommodate changes in the relationships between the primary owner and the dependent cardholders. To add a dependent account to a group, the dependent financial record for the dependent account is linked to the group master data. Adding a dependent account to a group may correspond to the primary owner or a dependent cardholder obtaining another card or may correspond to adding another dependent cardholder to the group. For example, a group could be established for a family that includes a mother, father and daughter. When the group is created, the group could include financial records corresponding to accounts held by the mother and father. Subsequently, a dependent financial record could be added for an account for the daughter.

To remove a dependent account from a group, the dependent financial record for the dependent account is delinked from the group master data. Removing a dependent account from a group may correspond to a change in family status. For example, a group could be established for a married couple with the husband as the primary owner and the wife as a dependent cardholder. If the couple divorces, then the group could be modified to delete the dependent financial records that correspond to accounts held by the wife. As will be apparent to those skilled in the art, a dependent account can also be removed from a group for reasons other than a change in family status.

A single account can be removed from a group or a number of accounts can be removed from a group. If an account is removed from a group, it can be moved to an existing group, used to create a new group, or can be designated as an independent account that is not a member of any group. If a dependent account is moved to an existing group, then the group identifier in the dependent financial record is changed to correspond to the group identifier for the existing group. If a dependent account is removed from one group and is used to create another group, then the dependent account can remain a dependent account or can be "matured" into a key account. To mature a dependent account into a key account, the relationship parameter for the dependent account is changed from dependent to key. If a dependent account is matured into a key account, the history for the dependent account that was accrued during the period that the dependent account was a member of the group follows the dependent account to the new group. If the dependent account is designated as an independent account, then the relationship parameter is set to blank.

If all the accounts in a group are removed from the group, then the group continues to exist for some pre defined period of time even though the group does not have any members. The group continues to exist so that audit history for the group can be maintained for the predefined period of time.

The primary owner of the group can be changed. The primary owner can be changed to a cardholder that corresponds to one of the dependent accounts or to a new primary owner. To change the primary owner to a dependent cardholder, the relationship parameter for the dependent account is changed from dependent to key. The original key account can be converted to a dependent account by changing the relationship parameter from key to dependent. Alternatively, the original key account can be removed from the group and transferred to another group (as either a key or dependent account) or established as an individual account in a manner similar to that described in the preceding paragraph.

A group history is maintained in the group master data. For example, as discussed above in connection with FIG. 4B, information on all the accounts that are or ever were members of the group are stored in the Group Member file. The history of any changes in the dependent strategy for a dependent account are maintained in the Member Relationship file and the history of any changes in the definition of a strategy is maintained in the Strategy Definition file. In addition to group history, account history is also maintained with each account. The account history follows the account notwithstanding changes in the account's membership in a group. For example, payment history for a dependent account follows the dependent account even if the dependent account is delinked from the group and is established as an individual account.

Adding a Dependent Account to a Group

Figure 7A:
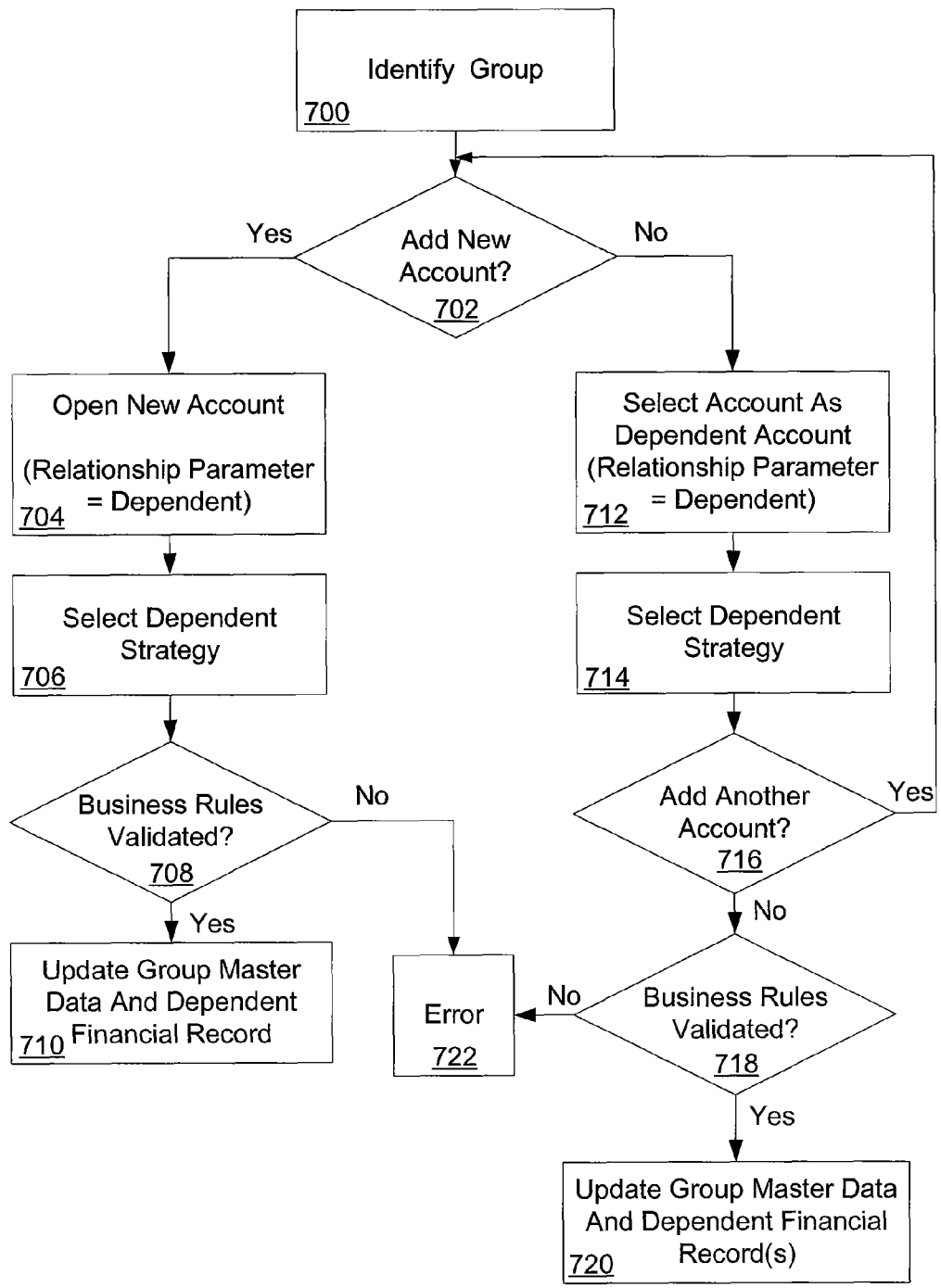
FIG. 7A is a flow diagram illustrating the steps for adding a dependent account to a group in accordance with an embodiment of the present invention.

Once a group is created, additional dependent accounts can be added to the group. The additional dependent accounts can be newly created accounts or can be existing accounts. FIG. 7A illustrates the steps for adding a dependent account to an existing group. In step 700, a group is identified. Typically a group is identified using the group identifier. In step 702, a determination is made as to whether an existing account is to be added or whether a new account is to be added. If a new account is to be added, then the "Yes" branch is followed to step 704. In step 704, a new account is opened and the relationship parameter for the account is set to dependent. A dependent strategy for the new account is selected in step 706. In step 708, a determination is made as to whether the dependent account opened in step 704 satisfies the business rules. If the dependent account satisfies the business rules, then the business rules are validated and the "Yes" branch is followed to step 710. In step 710, the group master data is updated. If the business rules are not validated in step 708, then the "No" branch is followed to step 722 and an error occurs.

If the determination in step 702 is that an existing account is to be added, then the "No" branch is followed to step 712. In step 712, an existing account is selected and the relationship parameter for the account is set to dependent. A dependent strategy for the account is selected in step 714. The parameters for the dependent account created in step 712 are compared to the business rules in step 718. If the parameters for the dependent account satisfy the business rules, then the business rules are validated and the "Yes" branch is followed to step 720. In step 720, the group master data is updated. However, if the business rules are not validated then the "No" branch is followed to step 722 and an error occurs.

Although FIG. 7A indicates that the group master data is updated after each dependent account is added to the group, the group master data can be updated at other points in the process. For example, if multiple accounts are to be added to an existing group, then the steps shown in FIG. 7A would be repeated for each account. Rather than updating the group master data after the addition of each dependent account, the group master data could be updated after the addition of all the dependent accounts. Updating the group master data after the addition of each account can be used to support on line processing, whereas updating the group master data after the addition of a number of dependent accounts can be used to support batch processing.

Group Processing

Once a group is created it can be used to perform group processing. Group processing typically includes authorizing transactions, applying group payments, creating group statements, controlling cardholder communications, and administering reward programs for the accounts in the group. Information from both the key account and the dependent accounts are used for group processing. Each dependent account has an associated dependent strategy that specifies group processing options for the dependent account. Although the accounts of a group are subject to group processing for some functions, the accounts are treated as individual accounts for other functions.

Authorizing a Transaction

The dependent strategy for a dependent account specifies the authorization option for the dependent account. The authorization option specifies the information that is used to authorize a transaction. In one embodiment of the invention, three authorization options are available for a dependent account. One authorization option considers only the credit line and available credit of the group, a second option considers only the credit line and available credit of the dependent account, and a third option considers the credit line and the available credit of both the group and the dependent account.

Depending upon the authorization option selected, the authorization processing uses the group credit line and the group available credit and/or the dependent credit line and the dependent available credit. The group credit line is a group parameter that typically is set when the group is created. The dependent credit line is a dependent account parameter that is set when the dependent account is opened. The group credit line and the dependent credit line can be modified. The group available credit is calculated real time using activity from the key account (if any) and any dependent accounts that share the group credit line. A dependent account shares the group credit line if payment for the dependent account is due from the primary owner. Generally, the group available credit is calculated by subtracting the current balances and any outstanding authorizations of the key account and the dependent accounts that share the group credit line from the group credit line. Similarly, the dependent available credit is calculated by subtracting the current balance and any outstanding authorizations of the dependent account from the dependent credit line.

Figure 7B:
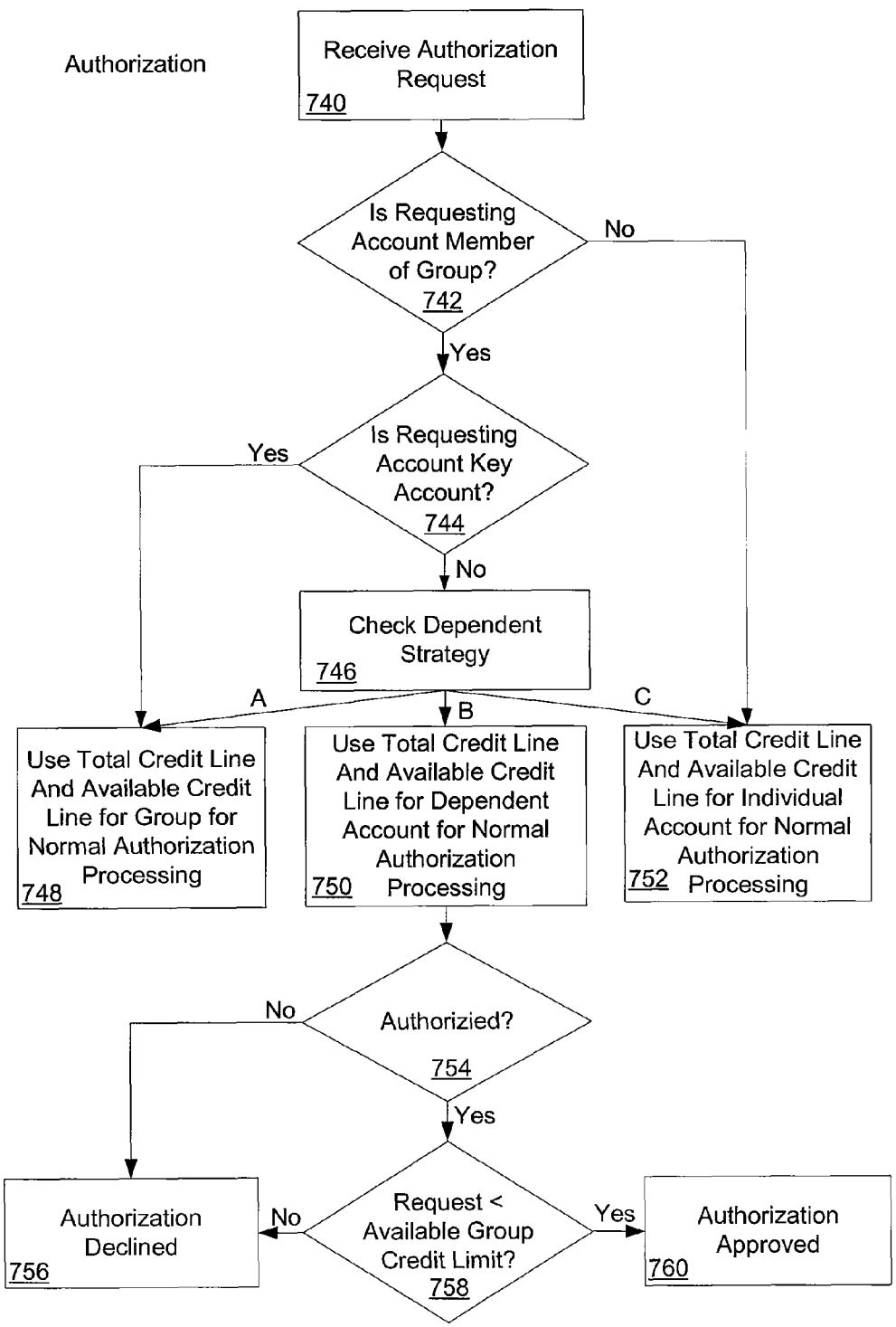
FIG. 7B is a flow diagram illustrating the steps for authorizing a transaction in accordance with an embodiment of the present invention.

FIG. 7B illustrates exemplary steps for authorizing a transaction. In step 740, an authorization request is received. The authorization request includes a transaction amount and an account identifier, such as an account number. In step 742, a determination is made as to whether the account identifier corresponds to an account that is a member of a group. If the requesting account is not a member of a group, then the "No" branch is followed to step 752. In step 752, normal authorization processing occurs using the credit line and the available credit for the account.

Normal authorization processing typically includes several calculations that use the credit line and the available credit. For example, authorization may include comparing the amount of the transaction to the available credit, comparing the amount of the transaction to a percentage expansion of the credit line, as well as comparing the transaction to past transactions for the account. Comparing the transaction to past transactions for the account may be used to detect possible fraudulent uses of a card and may result in the issuance of a referral code. As will be apparent to those skilled in the art, additional calculations can also be performed.

If the determination in step 742 is that the requesting account is a member of a group, then the "Yes" branch is followed to step 744. In step 744, a determination is made as to whether the requesting account is a key account or a dependent account. If the requesting account is a key account, then the "Yes" branch is followed to step 748. In step 748, normal authorization processing occurs using the group credit line and the group available credit.

If the determination in step 744 is that the requesting account is a dependent account, then the "No" branch is followed to step 746. In step 746, the dependent strategy is checked to determine the authorization option that corresponds to the dependent account. FIG. 7B illustrates three possible authorization options, A, B and C. Option A specifies that the credit line and the available credit for the group are used for authorization processing. Option B specifies that the credit line and the available credit for both the group and the dependent account are used for authorization processing. Option C specifies that the credit line and the available credit for the dependent account are used for authorization processing.

If the dependent strategy specifies option A, then the method proceeds from step 746 to step 748 and the credit line and the available credit for the group are used for normal authorization processing. If the dependent strategy specifies option C, then the method proceeds from step 746 to step 752 and the credit line and the available credit for the dependent account are used for normal authorization processing. The difference between the authorization processing performed in step 748 and the authorization processing performed in step 752 is that step 748 uses group information, whereas step 752 uses dependent account information.

If the dependent strategy specifies option B, then the method proceeds from step 746 to step 750 and the credit line and the available credit for both the group and the dependent account are used for authorization processing. In step 750, the credit line and the available credit for the dependent account are used in normal authorization processing. The authorization processing performed in step 750 is similar to that performed in step 752. However, additional processing is required for option B. In step 754, a determination is made as to whether the processing performed in step 750 indicates that the authorization request is authorized. If the processing performed using the dependent account information indicates that the request is authorized, then the "Yes" branch is followed to step 758. In step 758, a determination is made as to whether the transaction amount specified in the authorization request exceeds the group available credit. If the amount does not exceed the group available credit, then the "Yes" branch is followed to step 760 and the authorization request is approved. If the processing performed in step 754 indicates that the authorization request is denied or if the comparison performed in step 758 indicates that the amount of the request exceeds the group available credit, then the "No" branch is followed to step 756 and the authorization request is declined.

Applying a Payment

The dependent strategy for a dependent account specifies whether payment of the dependent account balance is due from the primary owner or is due from the dependent cardholder. If payment of the dependent account is due from the dependent cardholder, then the entire amount of a payment received from the dependent cardholder is credited to the dependent account. However, if the dependent account is paid by the primary owner, then the amount of the group payment that is credited to the dependent account depends upon the amount of the group payment, as well as the control settings for the group. Payment of the key account is due from the group payment.

The allocation of a group payment is partially determined by the amount of the payment and partially determined by the group payment options. The group payment options are typically set by the issuer. The group payment options could be part of the group control settings in the group master data. Alternatively, the group payment options could be stored in a separate file, such as a Product Control File, and associated with the group through the key account or through another means.

Only accounts included in the group balances during the processing of the last group statement are included in the automatic allocation of a group payment. The group balances for the last group statement can be determined from the Group Statement files in the group master data. The account balances for accounts in the group can be determined from the Member Statement files in the group master data.

Typically, the amount of the group payment is compared to one or more of the group balances. The group balances include the Last Statement Balance (LSB) and the Minimum Payment Due (MPD) for the group. The group balances may also include the group delinquency amount. The group LSB is determined by adding the LSB of the key account (if any) to the LSB of all dependent accounts in the group that are paid by the primary owner. If payment for a dependent account is due from the dependent cardholder, then the LSB of that dependent account is not included in the group LSB. The group MPD is calculated by adding the MPD for the key account (if any) to the MPD for each of the dependent accounts that are paid by the primary owner. The group delinquency amount is determined by adding the account delinquency of the key account (if any) to the account delinquency of the dependent accounts that are paid by the primary owner.

Figure 8A:
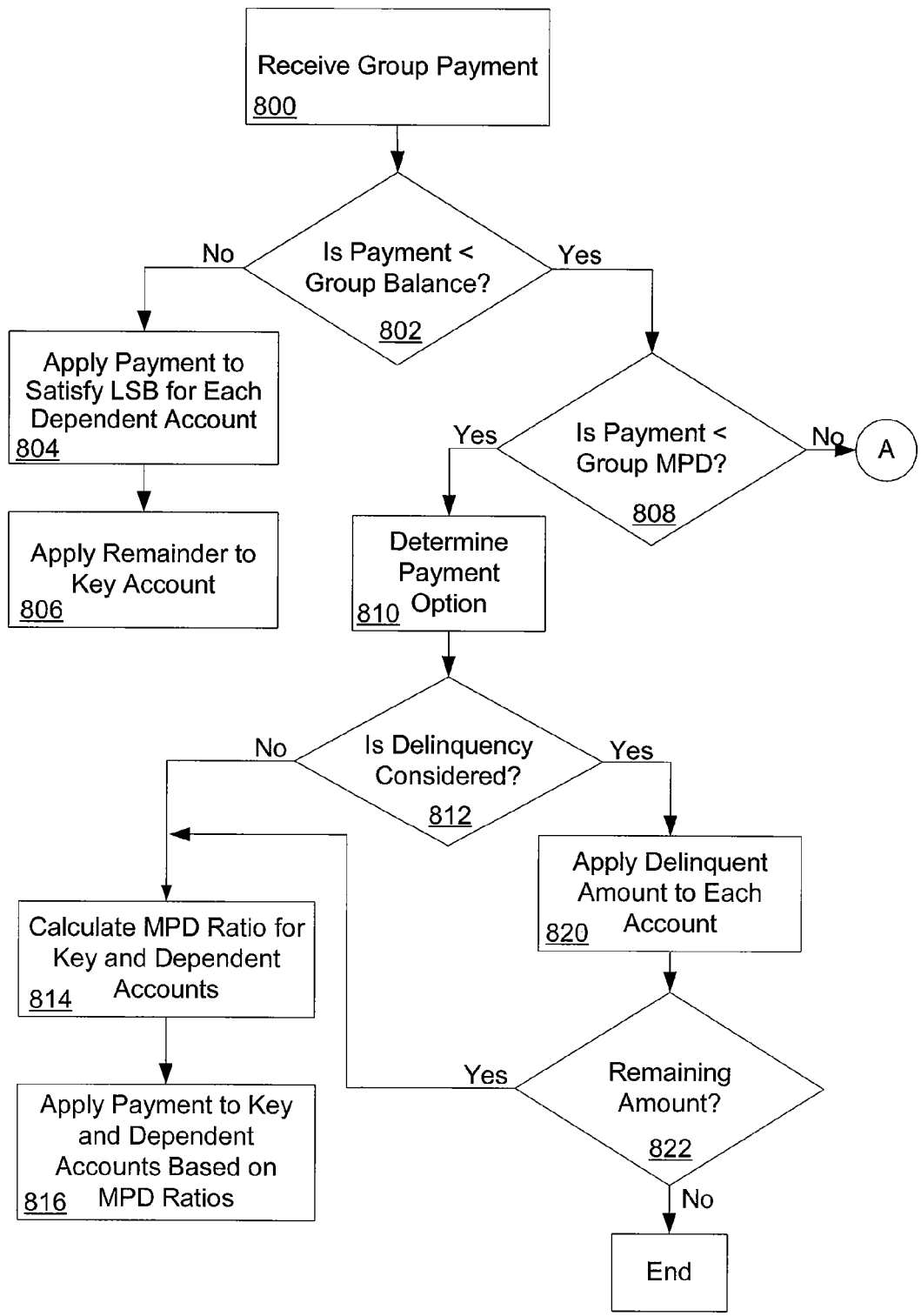
FIGS. 8A and 8B are flow diagrams illustrating the steps for applying a payment in accordance with an embodiment of the present invention.
Figure 8B:
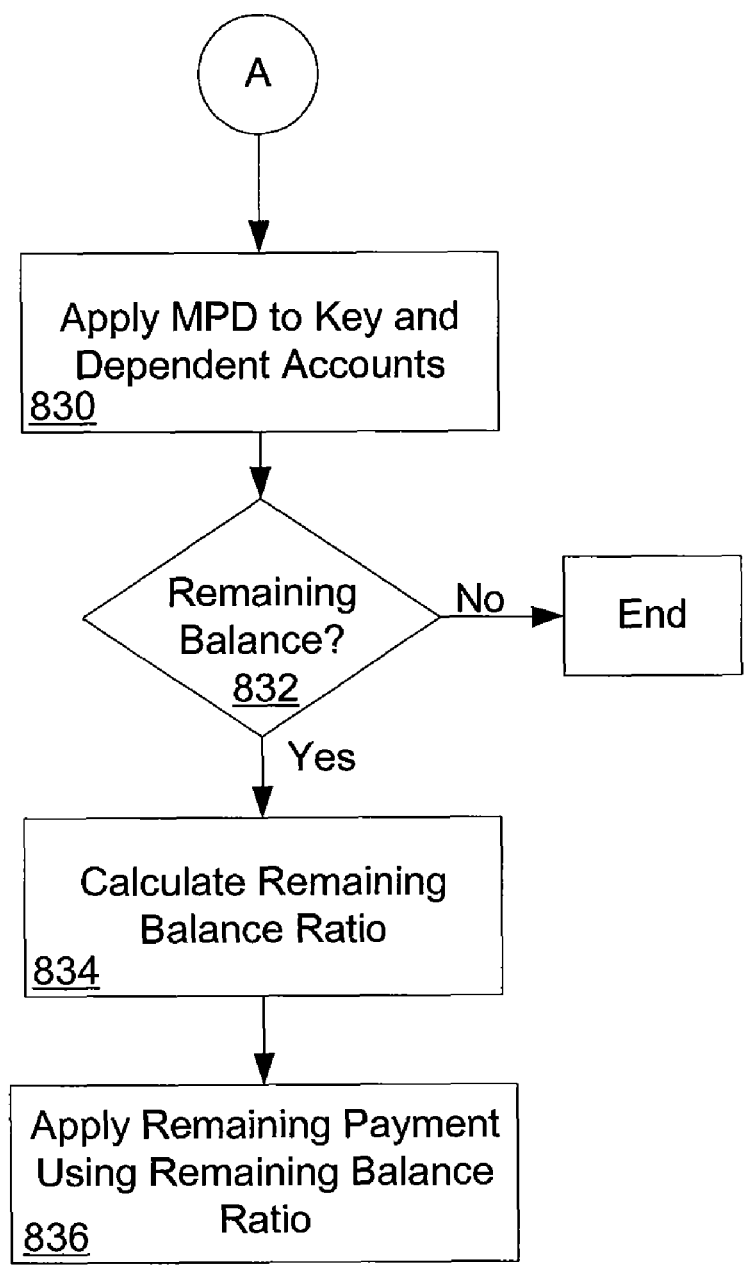

FIGS. 8A and 8B illustrate an exemplary method for applying a group payment. In step 800, the group payment is received. A determination is made in step 802 as to whether the payment is less than the group LSB. If the group payment is greater than or equal to the group LSB, then the "No" branch is followed to step 804. In step 804, the payment is applied to the dependent accounts in an amount equal to the LSB for each account. The remainder of the group payment is applied to the key account in step 806. If the payment is equal to the group LSB, then the amount applied to the key account is step 806 is equal to the LSB of the key account. However, if the group payment is greater than the group LSB, then the amount applied to the key account in step 806 is greater than the LSB of the key account. Although FIG. 8A illustrates that any overpayment is credited to the key account, an overpayment could be shared between the accounts of the group. Whether an overpayment is credited to the key account or shared between the accounts is typically determined by the group payment options.

If the determination in step 802 is that the group payment is less than the group LSB, then the "Yes" branch is followed to step 808. In step 808, a determination is made as to whether the group payment is less than the group MPD. If the group payment is less than the group MPD, then the "Yes" branch is followed to step 810. In step 810, the group payment options are determined. In step 812, a determination is made as to whether the group payment options indicate that account delinquency is considered in applying a group payment. If account delinquency is not considered, then the "No" branch is followed to step 814. In step 814, MPD ratios are calculated for the key account and the dependent accounts that are paid by the primary owner. An MPD ratio is calculated for an account by comparing the MPD for the account with the group MPD. Once the MPD ratios for the key account and the dependent accounts that are paid by the primary owner are calculated in step 814, then in step 816 the payment is applied to the key account and the dependent accounts in the group in accordance with the MPD ratios calculated in step 814.

If the determination in step 812 is that account delinquency is considered in applying the group payment, then the "Yes" branch is followed to step 820. In step 820, the group payment is applied to the key account and the dependent accounts paid by the primary owner to satisfy the delinquent amount for each account. In step 822, a determination is made as to whether there is any amount of the payment remaining. If there is an amount of the payment remaining, then the "Yes" branch is followed to step 814 and the remaining payment is allocated based upon the MPD ratios for the key account and the dependent accounts paid by the primary owner. If the determination in step 822 is that there is no remaining balance, then the method ends.

If the determination in step 808 is that the group payment is greater than or equal to the group MPD, then the "No" branch is followed to step 830 of FIG. 8B. In step 830, the group payment is allocated between the key account and the dependent accounts that are paid by the primary owner to satisfy the MPD for each account. A determination is made as to whether there is any amount of the group payment remaining in step 832. If there is an amount of the group payment remaining, then the method proceeds to step 834. In step 834, a remaining balance ratio is calculated for each of the accounts. A remaining balance ratio is calculated by comparing the remaining balance for an account to the remaining balance for the group. The remaining balance for an account is calculated by subtracting the MPD from the LSB for the account. The remaining balance for the group is calculated by subtracting the group MPD from the group balance. Once the remaining balance ratios are calculated in step 834, then the remainder of the payment is applied in accordance with the remaining balance ratios in step 836. If the determination in step 832 is that there is no remaining balance, then the method ends.

As will be apparent to those skilled in the art, other payment ratios could be considered when allocating a group payment among the accounts in the group other than those shown in FIGS. 8A and 8B. For example, as an alternative to steps 814 and 816, the group payment could be allocated based upon a LSB ratio rather than an MPD ratio or based upon an account hierarchy. An LSB ratio for an account can be calculated by comparing the LSB for the account to the LSB for the group. An account hierarchy specifies the order in which the accounts of a group are to be paid. Similarly, MPD ratios could be used as an alternative to the remaining balance ratios illustrated in FIG. 8B. Moreover, other account conditions could be considered in allocating a group payment. For example, in addition to or as an alternative to considering delinquent amounts, disputed amounts could be considered.

The exemplary method for payment application illustrated by FIGS. 8A and 8B is based upon the amount of the group payment, the dependent strategies and the group payment options. Preferably, the steps illustrated in FIGS. 8A and 8B can be overridden. For example, an operator could manually allocate a group payment between the key account and the dependent accounts in accordance with specific allocation instructions. The allocation instructions could be generated by the primary owner of the group or the issuer. If the group payment is an electronic payment, then instructions submitted with the electronic payment could determine how the payment is allocated. The allocation instructions could be for a single payment or could be standing instructions that apply to all payments received. If the allocation instructions are standing instructions, then the instructions could be stored in the group master data.

There are times when the application of a group payment needs to be reversed. For example, reversal of a payment is necessary if a check for the payment is returned for insufficient funds. If a check for a group payment is returned for insufficient funds, then the payment allocations to the accounts in the group are reversed. To reverse the payment allocations, the original payment allocation must be recreated. For example, if a group payment of $100 was allocated $50 to the key account, $25 to one dependent account and $25 to another dependent account, then reversal of the group payment is made by reversing the $50 payment allocation to the key account, the $25 payment allocation to the first dependent account and the $25 payment to the second dependent account. To reverse a payment, the Payment Allocation file is used to determine how the payment was originally allocated.

Generating Group Statements and Courted Statements

A group statement is created for the group and is sent to the primary owner. The group statement includes information about the activity of the key account (if any) and the activity of some or all of the dependent accounts of the group. The amount of information that appears on the group statement about a dependent account is controlled by the dependent strategy. Depending upon the dependent strategy, the group statement can include details of the activity of the dependent account or a summary of the activity of the dependent account.

Statement data is calculated for each account in the group. Statement data typically includes the MPD, LSB, reward information, finance charges, and late fees for the account. The statement data is calculated on an account by account basis. The statement data is used to create the group statement, a dependent statement, and/or a courtesy statement. The statement data is also used to calculate group data.

Group data includes the group MPD, group LSB, group reward information, group available credit, group finance charges and group late fees. The group data is calculated from the key account and any dependent accounts that are paid by the primary owner. The group statement also includes information about the previous group payment, including the amount, the posting date, etc. The group statement also includes information about the group, such as the primary owner, a listing of the accounts in the group, including the account numbers, and the dependent strategy for each dependent account in the group.

A dependent strategy specifies whether payment for the dependent account is due from the primary owner or from a dependent cardholder associated with the dependent account. The dependent strategy can also specify that a courtesy statement is generated. A courtesy statement is a statement that provides statement data to the cardholder, but does not require payment from the cardholder.

Figure 9:
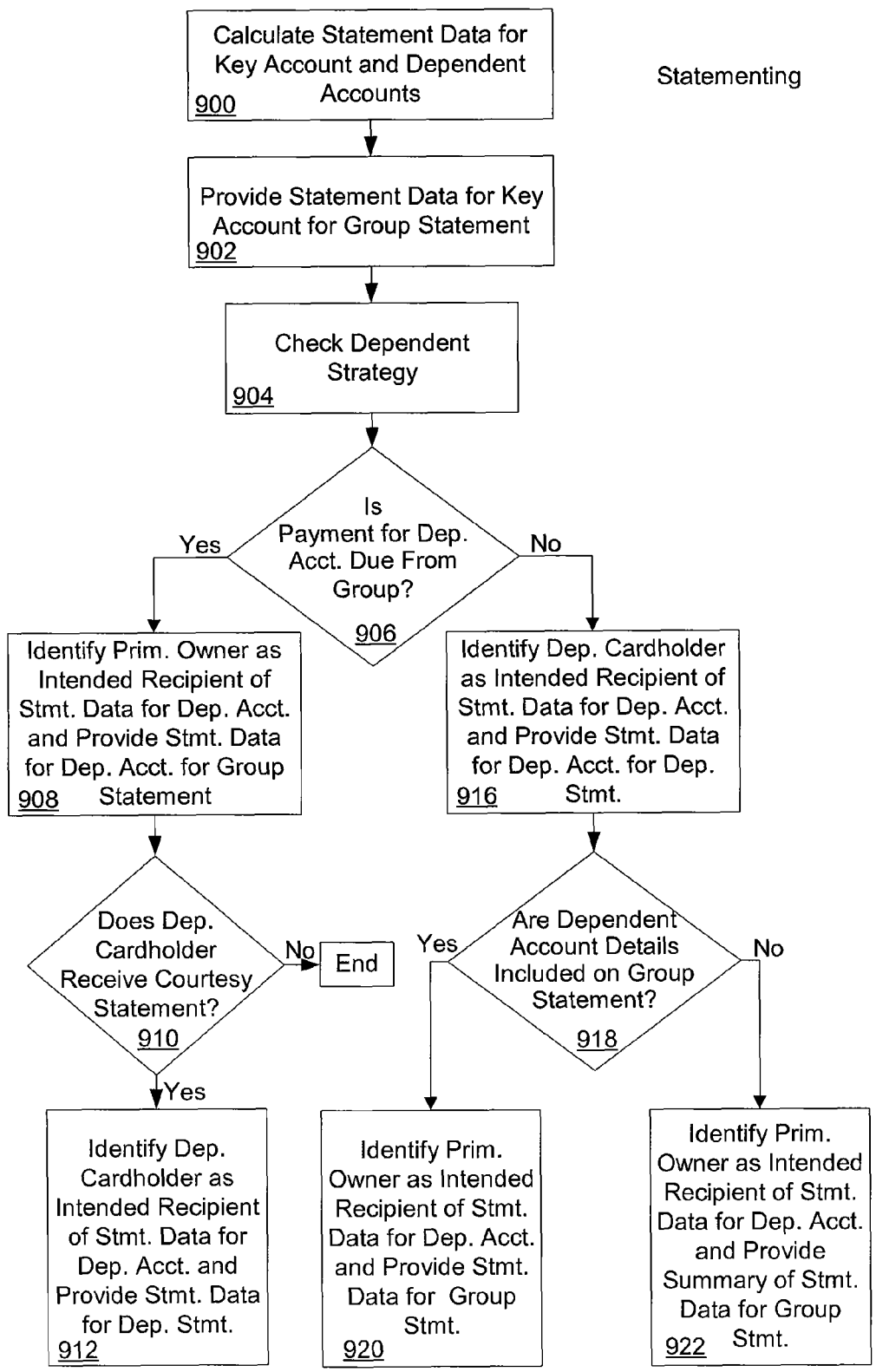
FIG. 9 is a flow diagram illustrating the steps for identifying intended recipients of statement data and providing statement data in accordance with an embodiment of the present invention.

FIG. 9 illustrates exemplary steps for identifying the addressees or intended recipients of statement data and for providing statement data for inclusion on the group statement, a dependent statement, and a courtesy statement. In step 900, statement data for the key account (if any) and the dependent accounts are calculated. If the group includes a key account, then the statement data for the key account is provided for the group statement in step 900. In step 904, the dependent strategy for a dependent account is checked to determine whether payment for the dependent account is due from the primary owner or from a dependent cardholder associated with the dependent account.

If payment for the dependent account is due from the primary owner, then the "Yes" branch is followed to step 908. In step 908, the primary owner of the group is identified as an intended recipient of the statement data for the dependent account and the statement data for the dependent account is provided for inclusion on the group statement. In step 910, a determination is made as to whether the dependent strategy specifies that the dependent cardholder receives a courtesy statement. If the dependent strategy specifies that the dependent cardholder receives a courtesy statement, then the "Yes" branch is followed to step 912. In step 912, the dependent cardholder is identified as another intended recipient of the statement data for the dependent account and the statement data for the dependent account is provided for inclusion on the dependent statement. If the determination in step 910 is that the dependent strategy does not specify that the dependent cardholder receives a courtesy statement, then the "No" branch is followed to step 914 and the method ends.

If payment for the dependent account is due from a dependent cardholder associated with the dependent account, then the "No" branch is followed to step 916. In step 916, the dependent cardholder of the group is identified as an intended recipient of the statement data for the dependent account and the statement data for the dependent account is provided for inclusion on a statement for the dependent cardholder. In step 918, a determination is made as to whether the dependent strategy specifies that the details of the activity of the dependent account are included on the group statement. If the details of the activity of the dependent account are included on the group statement, then the "Yes" branch is followed to step 920. In step 920, the primary owner is identified as another intended recipient of the statement data for the dependent account and the statement data for the dependent account is provided for inclusion on the group statement. If the dependent account statements on the same day as the group, then current statement data is provided for inclusion on the group statement. However, if the dependent account statements on a different day than the group, then statement data associated with the last dependent statement is provided for inclusion on the group statement.

If the determination in step 918 is that the details of the activity of the dependent account are not included on the group statement, then the "No" branch is followed to step 922. In step 922, the primary owner is identified as another intended recipient of the statement data for the dependent account and a summary of the statement data for the dependent account is provided for inclusion on the group statement.

Step 904 illustrates that the dependent strategy for a dependent account is checked. As will be apparent to those skilled in the art, if the group includes multiple dependent accounts, then steps 904 through 922 are repeated for each dependent account.

Cardholder Communications

The dependent strategy for a dependent account also provides cardholder communication options for the dependent account. The communication options specify the intended recipient of an original communication, such as a letter, notice, or plastic, and, in the case of letters or notices, specify whether a courtesy copy of the communication is provided. A communication is typically generated to provide information to the cardholder. For example, a communication can be generated to advise a cardholder of changes to the cardholder agreement or to advise a cardholder of special offers.

The dependent strategy can specify that the original communication is sent to the primary owner. The dependent strategy can also specify that a courtesy copy of the communication is sent to the dependent cardholder. Alternatively, the dependent strategy can specify that the original communication is sent to the dependent cardholder. If the dependent strategy specifies that the original communication is sent to the dependent cardholder, the dependent strategy can also specify that a courtesy copy of the communication is sent to the primary owner.

In some instances, it may be necessary to generate multiple courtesy copies. This situation may occur if two parties are jointly liable on an account. For example, a dependent account could be jointly held by a first dependent cardholder and a second dependent cardholder. If the dependent strategy specifies that the first dependent cardholder receives the original communication and that the primary owner receives a courtesy copy, then in addition to the courtesy copy sent to the primary owner, a second courtesy copy is sent to the second dependent cardholder because the account is jointly held.

If the group includes multiple dependent accounts, then the dependent strategies for the dependent accounts can specify that the primary owner is to receive the original communication or a courtesy copy. Preferably, it is recognized that multiple communications are being sent to the primary owner so that the communications can be merged into a single communication that includes the communications for all the dependent accounts.

A group communication can include information about some or all of the accounts within a group. Typically, a group communication is sent to the primary owner of the group. Information about selected accounts of the group is obtained from the financial records corresponding to the accounts. The type of information obtained from the financial records can vary according to the type of communication. Typically, the type of information is specified by a processing option or variable associated with the communication. The information obtained from the financial records is combined into a single communication. The single communication can be automatically generated.

A group communication can also be manually created. The group communication can include information about the accounts within the group. To manually create a group communication, an operator can use a series of on line screens to specify the accounts and the type of information to be included in the communication.

In addition to letter communications, the primary owner and the dependent account cardholders may also receive notices. Notices are added to a group statement by considering what notices are required for the key account, what notices are required for each of the dependent accounts, and what notices are optional for the key account and the dependent accounts. If several accounts require the same notice, then preferably the notices are reviewed to insure that no duplicates are included.

Pooling Rewards, Accruing Rewards, and Redeeming Rewards

Reward programs allow parties to earn reward points based on purchases and other account activity. The processing of reward points at the account and/or group level can be determined by the reward program and the dependent strategies of the dependent accounts in a group. In some cases, the availability of group level pooling is determined by the reward program. It may be that some programs permit group pooling, whereas other programs do not. If the accounts in a group are members of multiple reward programs, then it is possible that some programs permit pooling while other programs do not.

If a reward program supports pooling, then any reward points earned by one or more accounts in an account group can be combined into the group reward pool. The dependent strategy specifies whether reward points earned by a dependent account are pooled or are maintained at the account level. In addition, the dependent strategy specifies whether the dependent account cardholder can redeem group reward points.

Figure 10:
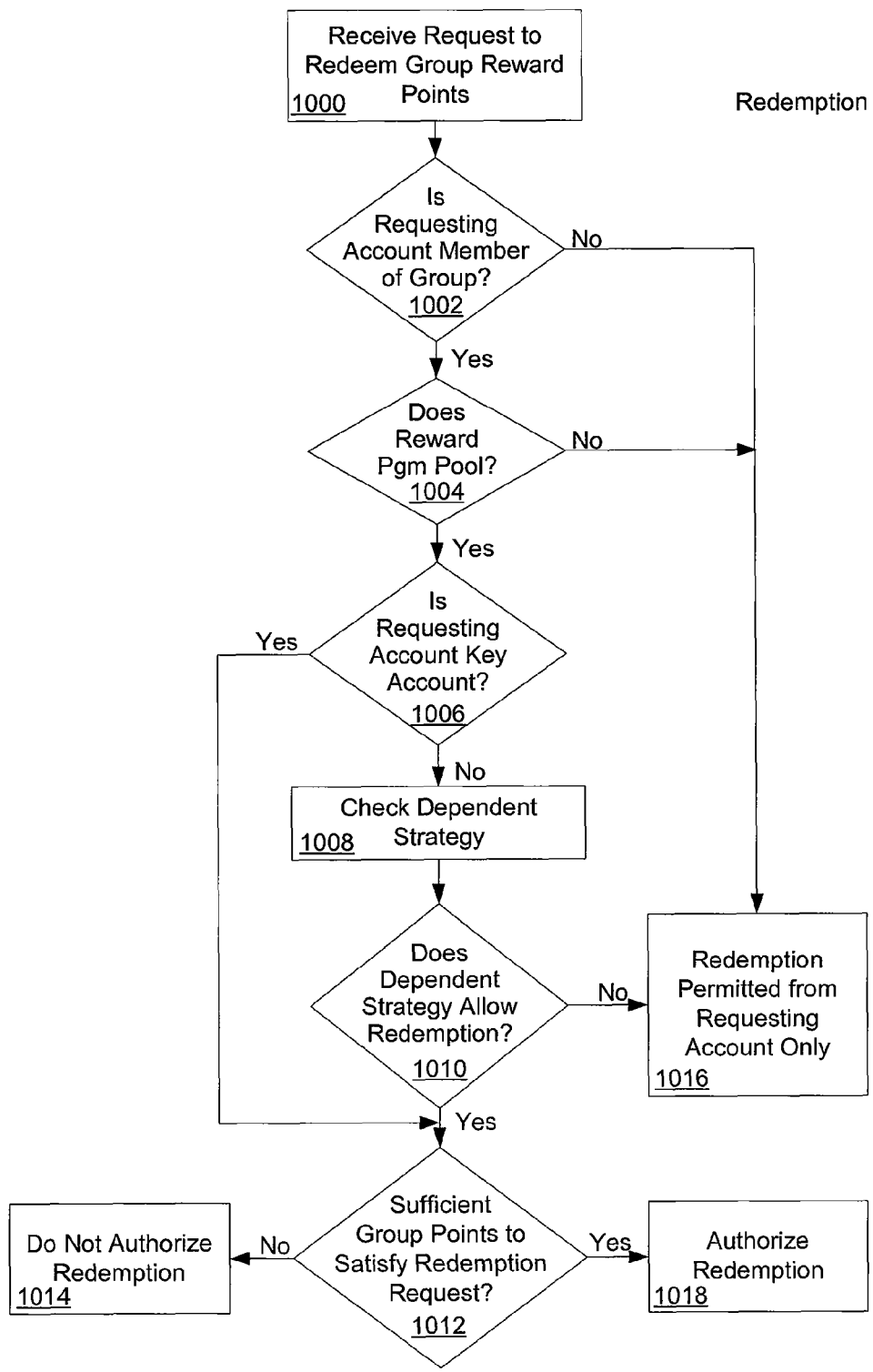
FIG. 10 is a flow diagram illustrating the steps for redeeming group reward points in accordance with an embodiment of the present invention.

An exemplary method for redeeming group reward points is shown in FIG. 10. In step 1000, a request to redeem group reward points is received. In step 1002, a determination is made as to whether the request is associated with an account that is a member of the group. If the request is from an account that is a member of the group, then the "Yes" branch is followed to step 1004. In step 1004, a determination is made as to whether the reward program supports pooling. If the reward program supports pooling, then the "Yes" branch is followed to step 1006. In step 1006, a determination is made as to whether the account making the request is the key account. If the requesting account is the key account, then the "Yes" branch is followed from step 1006 to step 1012. However, if the requesting account is not the key account, then the requesting account is a dependent account and the "No" branch is followed from step 1006 to step 1008. In step 1008, the dependent strategy for the requesting dependent account is checked. A determination is made in step 1010 as to whether the dependent strategy specifies that the dependent account can redeem group reward points. If the dependent account can redeem group reward points, then the "Yes" branch is followed to step 1012.

In step 1012, a determination is made as to whether there are sufficient group points to satisfy the redemption request. If there are sufficient points, then the "Yes" branch is followed to step 1018 and the request to redeem group reward points is authorized. However, if there are not sufficient points, then the "No" branch is followed to step 1014 and the redemption request is not authorized.

If the determination in step 1002 is that the request to redeem group reward points is made by an account that is not a member of a group or the determination in step 1004 is that the reward program does not support reward point pooling, then the method proceeds to step 1016. Likewise, if the determination in 1010 is that the dependent account strategy does not allow the redemption of group reward points, then the method proceeds to step 1016. In step 1016 the requesting account is permitted to redeem points that are associated with the requesting account, but is not permitted to redeem group points.

As an alternative to reward point pooling, reward points can be shared between the accounts of a group via chasing. If chasing is implemented, then reward points earned by an account remain at the account level. The points can be chased or collected from the account level and used to satisfy a single redemption request.

Preferably, chasing is enabled or disabled by the reward program. If chasing is enabled by the reward program, then the accounts that participate in the reward program can support chasing. If an account supports chasing, then the account permits another account to redeem its earned reward points. If the account is a key account, then the option to support chasing could be part of the predefined relationship between the key account and the group. If the account is a dependent account, then the option to support chasing could be part of the dependent strategy. The ability to chase reward points could expand beyond the group to accounts that are not members of the group.

If a cardholder makes a redemption request that exceeds the reward points associated with the cardholder's account, then a determination is made as to whether the reward program supports chasing. If the reward program supports chasing, then the accounts that permit chasing in that reward program are identified. Points are chased from the identified accounts to satisfy the redemption request. The points are chased from the accounts based on a chasing option that specifies how the points are chased from the identified account. The chasing option could specify that the points are chased from the accounts on a pro rata basis, on the basis of an account hierarchy, or on some other basis. Chasing could be performed by an operator pursuant to instructions received by a cardholder. If chasing is performed by an operator, then the accounts that support chasing are displayed and the operator can select the accounts to chase. The operator can also determine the number of points chased from each account. Of course, while FIG. 10 is directed to reward access in a group environment, such reward access can also be applied to redeeming rewards from a single account associated with a redeeming party, or even an account or account group unrelated to the redeeming party.

Figure 11:
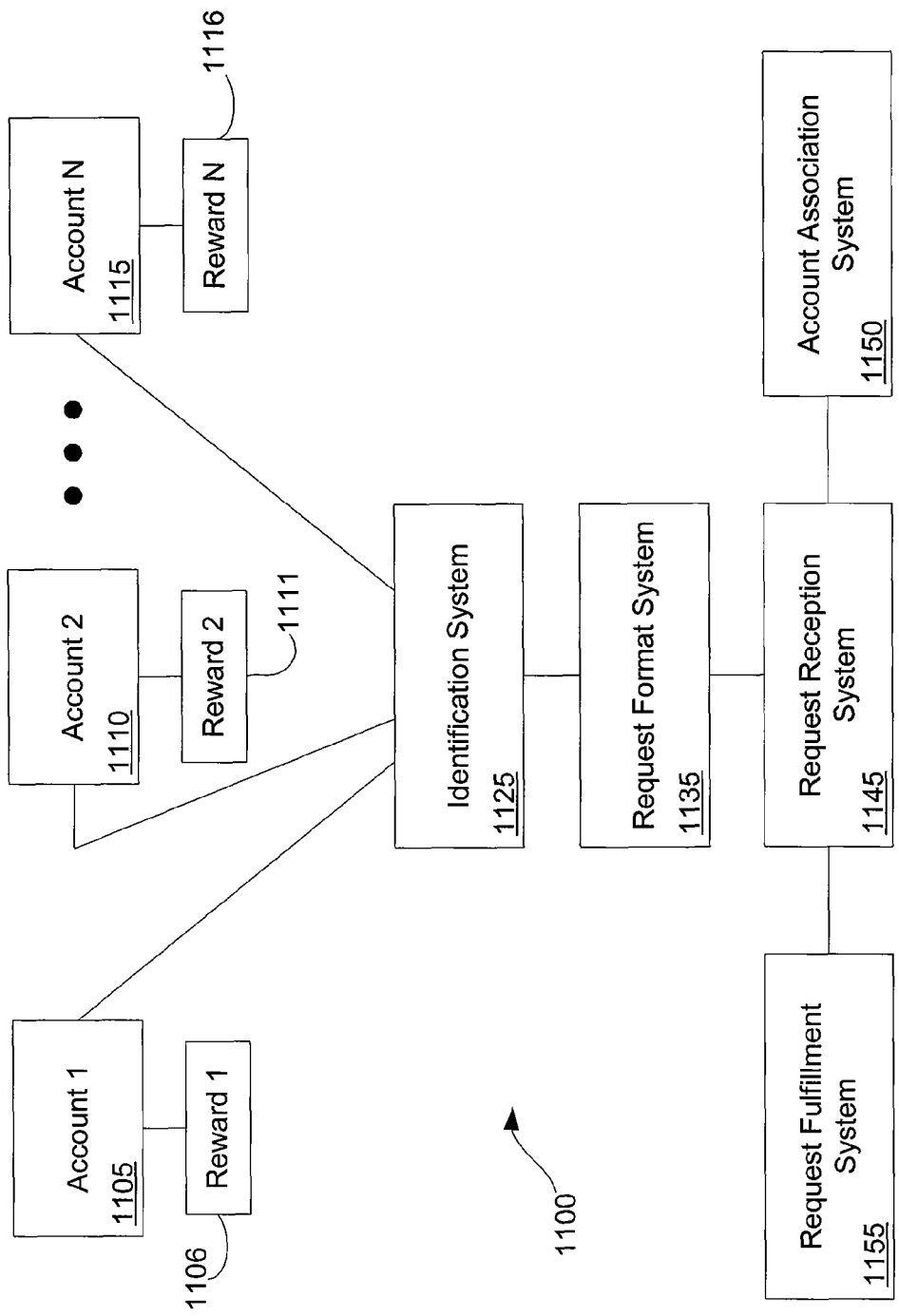
FIG. 11 illustrates a system in accordance with embodiments of the present invention for accruing and redeeming rewards.

Turning to FIG. 11, a system 1100 is configured in accordance with an embodiment of the present invention for accruing rewards, identifying rewards, redeeming rewards and/or fulfilling reward redemption requests. As will be appreciated from the disclosure provided herein, many other configurations of system 1100 are possible in accordance with the present invention. As illustrated, system 1100 includes a number of accounts 1105, 1110, 1115. One or more of the accounts are associated with rewards 1106, 1111, 1116. Further, it is possible that such accounts can be associated with multiple reward types, or only a single reward type. In some cases, the reward associated with the account is maintained in a separate reward account, while in other cases, the account only serves to maintain the reward. Thus, for example, account 1105 can be a credit card account that accrues frequent flyer miles in a separate, but integrally related reward account 1106. In contrast, account 1110 can be a frequent flyer account that is augmented based on travel activity, and the primary function of account 1110 is to account for reward 1111.

System 1100 further includes an identification system 1125, a request format system 1135, a request reception system 1145, an account association system 1150, and a request fulfillment system. Identification system 1125 comprises a computer capable of accessing accounts 1105, 1110, 1115. In accessing accounts 1105, 1110, 1115, identifying system 1125 can determine what type of rewards 1106, 1111, 1116 that are associated with accounts 1105, 1110, 1115, as well as the amount of any accrued reward. When rewards are redeemed, or moved to another accounting entity, identification system 1125 can deduct any redeemed reward. In addition, where a reward is redeemed prior to being earned, identification system 1125 can maintain an accounting of the reward deficit until a sufficient reward has been accrued to cover the deficit.

Further, in some cases, identification system 1125 can compute the rate at which the identified rewards are accruing. As such, identification system 1125 can determine an approximate point in time when a sufficiently large award will be available to satisfy a reward redemption request. Further, in some cases, identification system 1125 can be responsible for identifying when a reward threshold has been achieved such that an automatic redemption is triggered. In various cases, identification system 1125 can further assign or otherwise determine a common value associated with any accrued reward. Thus, as further discussed below where rewards are exchanged on a public market, an exchange value for unrelated reward types can be fixed and used in relation to an effectuated exchange. Where such a public exchange is implemented, identification system 1125 can be responsible for transferring value between accounts to cover any exchange of rewards.

Request format system 1135 is a computer, or in some cases the same computer as identification system 1125, that formats one or more requests that affect accounts 1105, 1110, 1115. For example, request format system 1135 includes functionality to parse a reward redemption request and separate an account, a reward amount, and a reward type from a received request. Further, request format system 1135 can parse requests to group accounts, or otherwise modify group relationships as previously described. Yet further, request format system 1135 can parse fulfillment information such that rewards are deducted from the proper account 1105, 1110, 1115 upon redemption of one or more rewards.

Request reception system 1145 is a computer, or in some cases the same computer as identification system 1125, that is responsible for receiving requests in relation to accounts 1105, 1110, 1115. For example, request reception system can provide interfaces for receiving requests from account owners to group accounts and/or modify rules associated with the accounts and account groups. Thus, in some cases, request reception system 1145 serves Internet web pages that include user interfaces for receiving such requests. Alternatively, request reception system 1145 supports an IVR, or other such automated equipment for receiving requests in relation to accounts 1105, 1110, 1115. As another example, such interfaces can be provided to receive reward redemption requests, and to view the status of accounts 1105, 1110, 1115.

Account association system 1150 is a computer, or in some cases the same computer as identification system 1125, that implements the business rules related to assembling accounts into account groups, and defining account group rules as previously described. Thus, when a request is received to modify one or more group relationships via request reception system 1145, account association system 1150 can be accessed to approve the modification, and once approved, identification system 1125 can be accessed to implement the modification in relation to accounts 1105, 1110, 1115.

Request fulfillment system 1155 is a computer, or in some cases the same computer as identification system 1125, that is responsible for assuring that reward redemption requests are satisfied. In some cases, such reward redemption requests are received from consumers and involve an indication of a reward to be redeemed and the person redeeming the reward. In other cases, such reward redemption requests involve identifying an account that has accrued sufficient rewards to be redeemed, and contacting a person associated with the account to obtain a selection of a reward to be redeemed. In some cases, request fulfillment system 1155 is maintained by an entity other than the entity maintaining accounts 1105, 1110, 1115. Thus, for example, request fulfillment system 1155 can be maintained by a retailer contracted by the entity maintaining accounts 1105, 1110, 1115 to provide third party fulfillment of reward redemption requests. This can be advantageous as it allows an entity more capable of fulfilling redemption requests to perform the fulfillment requests, leaving the entity maintaining accounts 1105, 1110, 1115 largely unburdened.

Figure 12:
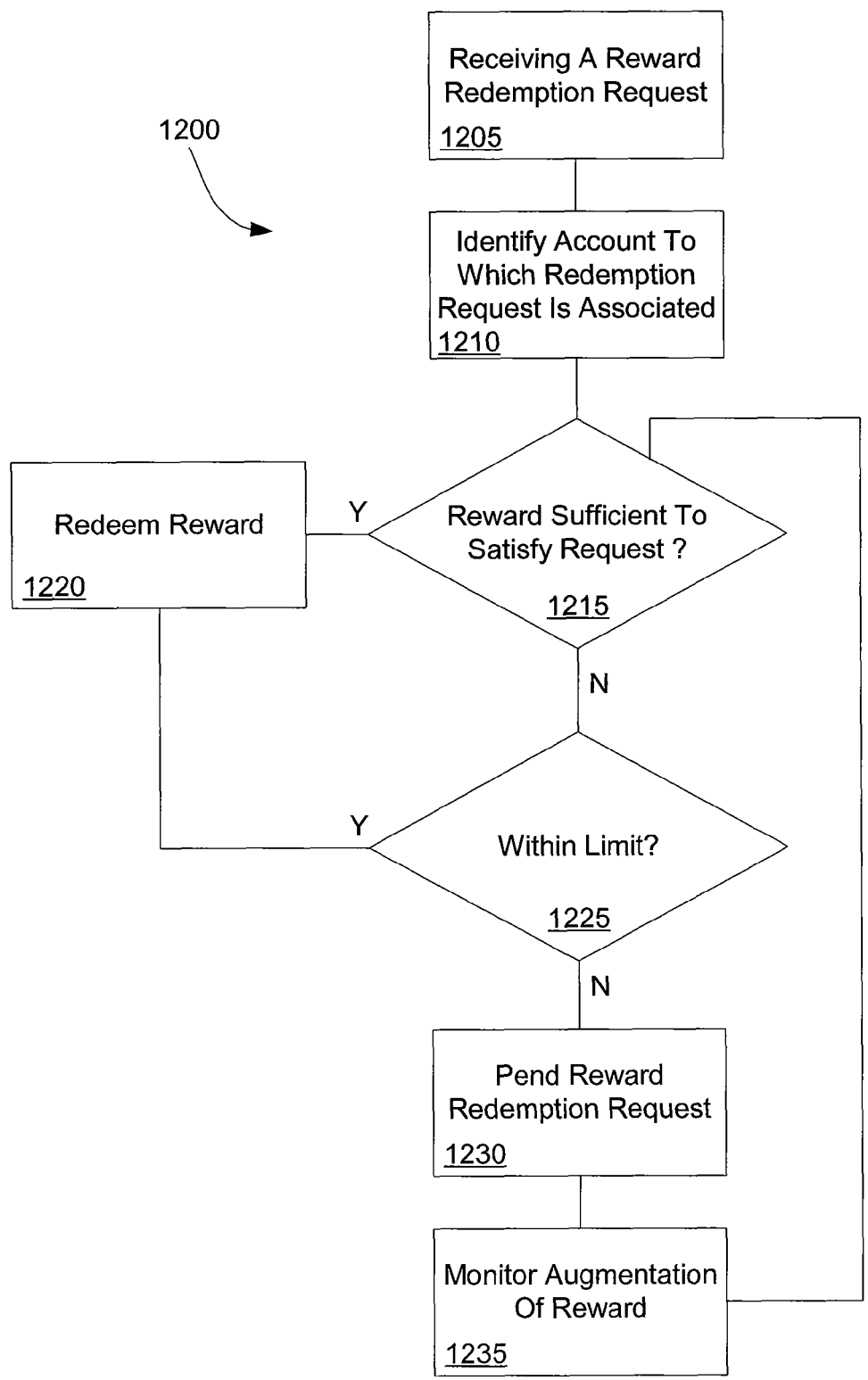
FIG. 12 illustrates a flow diagram for receiving and pending reward redemption requests in accordance with embodiments of the present invention.

Referring to FIG. 12, a flow diagram 1200 illustrating a method for redeeming rewards in accordance with embodiments of the present invention is provided. As illustrated, a reward redemption request is received (block 1205). In some cases, this reward redemption request is received from an owner of an account, while in other embodiments, this reward redemption request is received from a member of an account group. The account and/or account group to which the reward redemption request is associated is then determined (block 1210).

It is then determined if a sufficient reward is associated with the account group and/or account to satisfy the reward redemption request (block 1215). Thus, where the reward redemption request is to be satisfied from a reward associated with an individual account, it is determined whether the reward associated with the individual account is sufficient to cover the request. Alternatively, where the reward is to be satisfied from an account group, it is determined whether a reward pool associated with the account group includes a reward large enough to satisfy the request. As yet another alternative, where the reward is to be satisfied from an account group, it can be determined whether rewards maintained in relation to one or more accessible accounts in the account group, either separate or aggregated, are sufficiently large to satisfy the request. Where the reward(s) are sufficiently large, then the reward redemption request is fulfilled and the reward (s) is/are deducted from the appropriate account(s) and/or account group (block 1220).

Alternatively, where the reward(s) are not sufficiently large, it is determined whether the total rewards are within a predefined range of the reward redemption request (block 1225). In some cases, it may be determined that the available reward is within a particular threshold of meeting the reward redemption request. Thus, for example, it may be determined whether the available reward is within twenty percent of that required to satisfy the reward redemption request. Alternatively, a reward accrual velocity, or the rate at which the reward has been augmented over some period, can be calculated. This reward accrual velocity can be used to calculate a point in time where the reward will be sufficient to satisfy the reward redemption request. In this way, it can be determined whether, based on past and/or present performance, that the available reward will be sufficiently large within a set time period. Such a time limit can be, for example, one month. In yet other cases, a combination threshold and time limit test can be applied. Thus, for example, it can be determined whether a threshold required to meet the reward redemption request will be met in a given time period.

Where it is determined that the available reward is or will be within a set range (block 1225), then the reward redemption request is fulfilled and the reward(s) is/are deducted from the appropriate account(s) and/or account group (block 1220). Further, the deficit between the available reward(s) and the amount of the reward redemption request is recorded. This deficit is satisfied as the reward is augmented based on activity associated with the account(s) and/or account group.

Where it is determined that the available reward is not within a defined limit (block 1225), the reward redemption request is stored and remains pending until it is either canceled, the required reward is achieved, or the available reward is augmented within the defined threshold and/or will increase to such levels within a defined time frame (block 1230). Where the reward redemption request is not canceled, the augmentation of the reward(s) is/are monitored to determine when the reward(s) is/are sufficiently large to allow fulfillment of the reward redemption request (block 12). Such augmentation of the rewards can be based on use of an account and/or activity of person(s) associated with the account, or accounts within an account group. Thus, for example, a frequent flyer reward may be augmented based on travel of a person associated with an account or account group, and/or based on use of a financial account where frequent flyer miles accrue based on spending.

As an example, a reward redemption request can be received from a person owning an account associated with an account group, and requesting 35,000 frequent flyer miles to exchange for a plane ticket. It may be determined that the account owned by the person has only 25,000 frequent flyer miles available, and that the account is accruing frequent flyer miles at a rate of 3,000 per month. A rule may exist that allows for redemptions to be fulfilled where eighty percent of the total required reward is available, and where the deficit reward will likely be repaid within three months. Thus, in this case, the reward redemption request will be fulfilled in the following month where the balance will likely be 28,000 frequent flyer miles, or eighty percent of the required 35,000, and the accrual velocity indicates that the total reward will be available within the three succeeding months.

Figure 13:
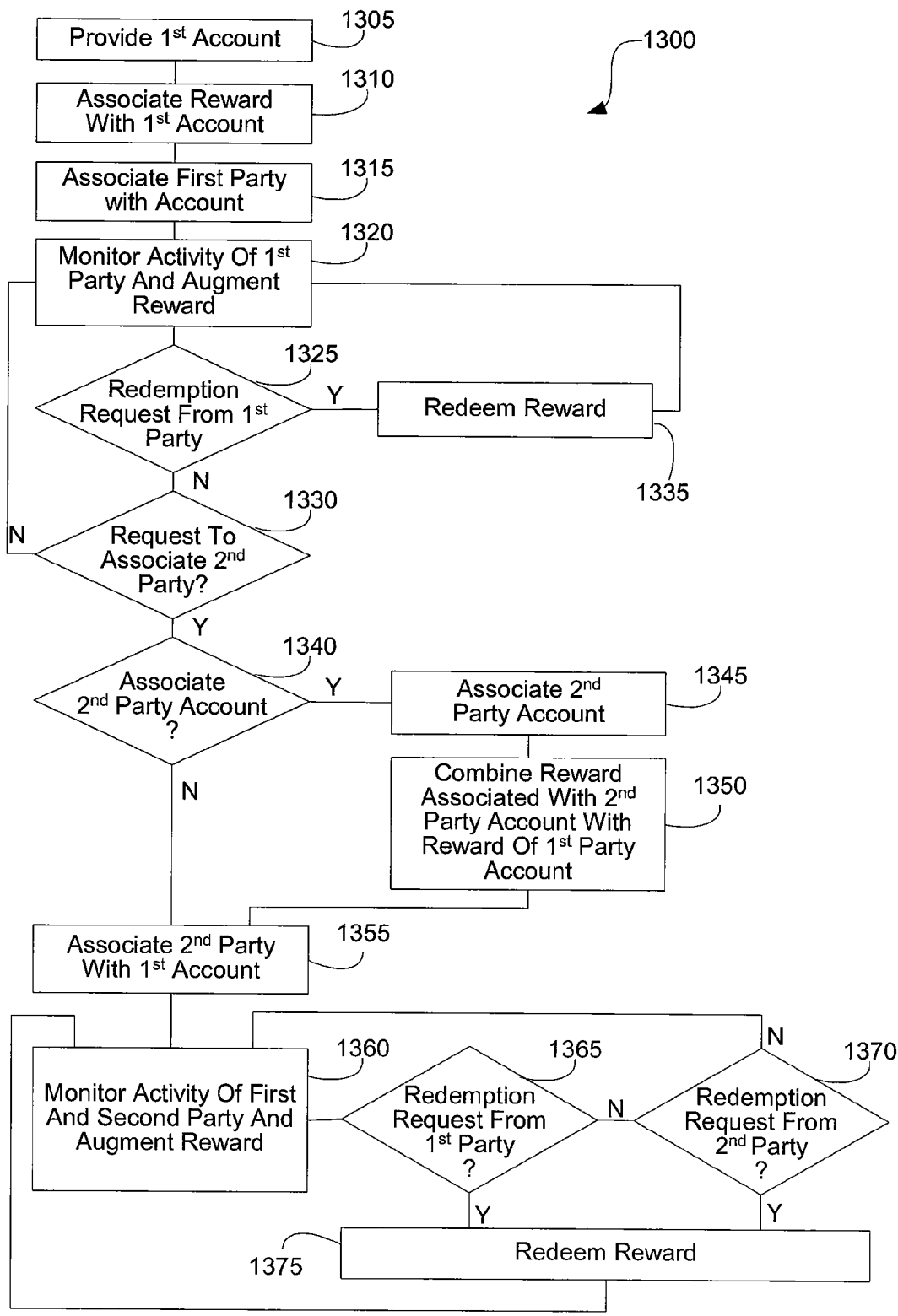
FIG. 13 illustrates a flow diagram for redeeming reward redemption requests according to various embodiments of the present invention, where parties associated with an account initiate the reward redemption requests.

Referring to FIG. 13, a flow chart 1300 illustrates another embodiment of the present invention for accruing and/or redeeming rewards. As illustrated, a first account is provided (block 1305). In some cases, this can include setting up a financial record associated with the account, and where applicable, providing a presentation instrument for accessing the financial account. In other cases, this can include setting up various accounts for maintaining vacation days, sick days, insurance benefits, and the like. In yet other instances, this can include setting up a frequent travel account or other incentive account. Based on the disclosure provided herein, one of ordinary skill in the art will recognize a myriad of other account types that can be set up in accordance with the various embodiments of the present invention.

A reward and a party are associated with the first account (blocks 1310, 1315). Activity of the first party is then monitored and the associated reward is augmented based upon the activity (block 1320). Such activity by the party can include any number of activities including, but not limited to, travel, purchases, use of a financial account, years of service to an employer, payment for insurance benefits, and the like. Where a reward redemption request is received from the party associated with the first account (block 1325), it is determined if a sufficient reward has accrued to satisfy the request, and the request is fulfilled by redeeming the reward (block 1335). Such a process includes exchanging the accrued reward, or portion thereof for merchandise, services, or other value obtainable thereby. Where neither a request to redeem (block 1325), nor a request to associate another party with the first account (block 1330) is received, monitoring activity associated with the first party continues as previously discussed (block 1320).

Alternatively, or in addition, where a request to associate another party with the first account is received (block 1330), it is further determined if an account associated with the other party will also be associated with the first account (block 1340). Where another account is to be associated with the first account, the other account is grouped with the first account as previously discussed in relation to account grouping (block 1345). Further, in some cases, any reward associated with the added account can be combined with that of the first account in a reward pool (block 1350). Alternatively, in some cases, the two rewards are combined and maintained in association with the first or second account, while in other cases, the rewards remain associated with the respective accounts and are chased when a reward redemption request is received.

The second party is also associated with the first account by, for example, adding the second party to the first account as a liable party (block 1355). Alternatively, the second party can be added to a group that includes the first account, thereby making the reward associated with the first account accessible to the second party. At this point, activity of both the first and second parties is monitored, and the reward augmented accordingly (block 1360). Thus, where a second account associated with the second party is grouped with the first account and the rewards are maintained in a reward pool, activity by either party will augment the reward pool. Alternatively, where a second account associated with the second party is grouped with the first account, but the rewards remain with the respective accounts, activity of the first party augments the reward associated with the first account, and activity of the second party augments the reward associated with the second account. As yet another alternative, where the second party is merely associated with the first account, activity of both the first and second party augment the reward associated with the first account. Based on the disclosure provided herein, one of ordinary skill in the art will recognize many other combinations for augmenting rewards maintained in relation to accounts and/or account groups.

Where a redemption request is received from the first party (block 1365), the redemption request is satisfied where a sufficient reward is available (block 1375). The same process can be used to satisfy reward redemption requests from the second party (block 1370). The reward used to fulfill the redemption request can be deducted from a reward pool associated with an account group, or the reward associated with the first account where a second account was not added and an account group does not exist. Alternatively, some form of reward chasing can be implemented where the reward is satisfied first from an account owned by the requester, and secondarily from another account linked to the first account.

Thus, for example, where the reward redemption request is received from the first party and requires a reward of X, whatever portion of X is available from the first account is first accessed to satisfy the request, and then the remaining portion of X is accessed from the second account.

As one particular example of the method, frequent flyer rewards are accrued. In the example, an account is provided and associated with a frequent flyer reward that is augmented based at least in part on activity of a party. A request is received to associate another party with the account, and this added party is associated with the account. Upon association, the frequent flyer reward accrues based at least in part on activity of the added party. Once the party is added to the account, reward redemption requests from either party can be satisfied, and activity by either party augments the available frequent flyer reward.

As another example, frequent flyer rewards can be accrued to a commonly accessible account or account group where at least two accounts are provided that are each associated with frequent flyer rewards. Each account accrues a frequent flyer reward based on activity of the party or parties associated with the respective accounts. Reward redemption requests can then be satisfied from a combination of the rewards associated with the individual accounts.

Figure 14:
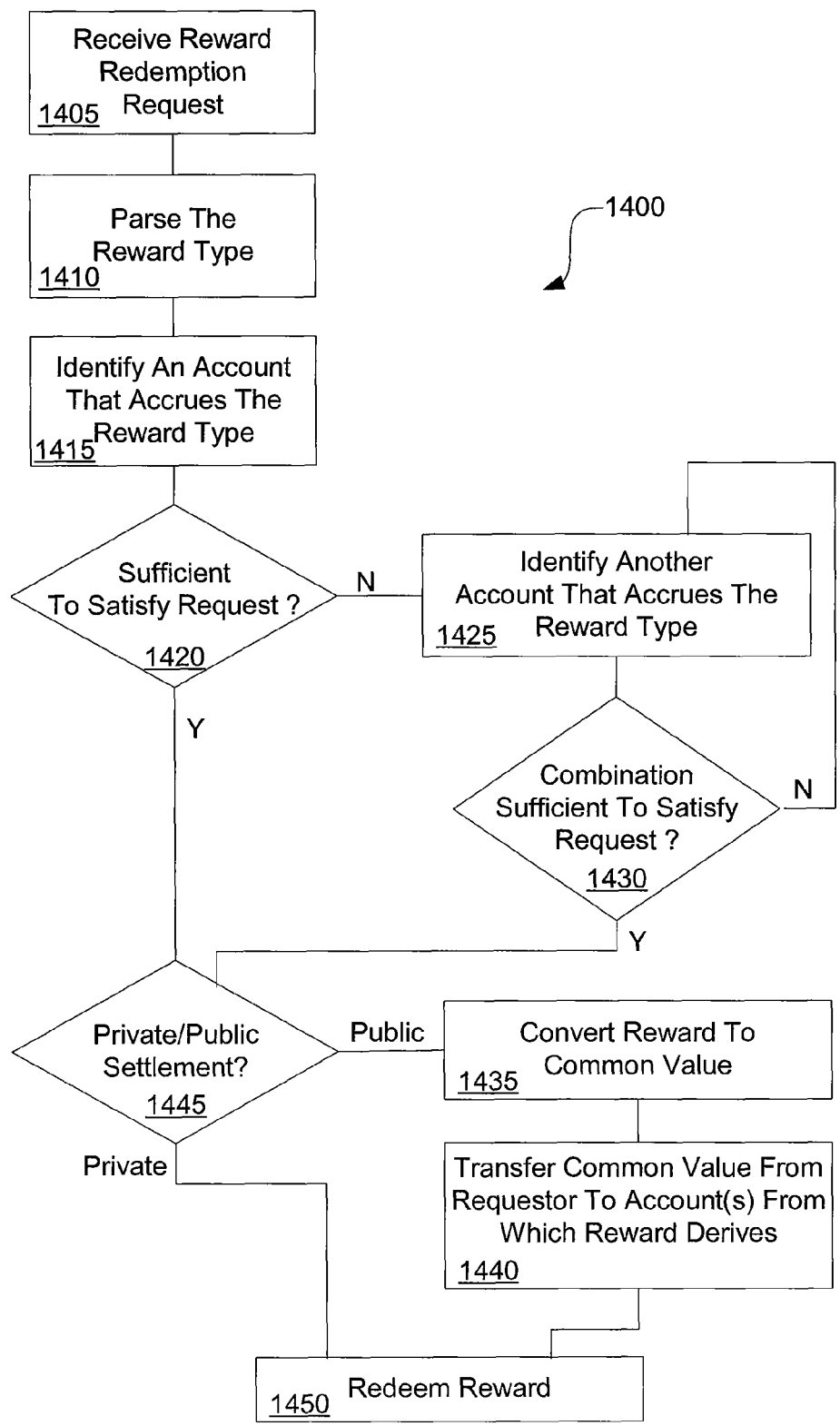
FIG. 14 illustrates a flow diagram for redeeming reward redemption requests in accordance with embodiments of the present invention, where an account that accrues a particular type of reward is identified and the reward obtained therefrom.

Turning to FIG. 14, a flow diagram 1400 illustrates yet another embodiment of the present invention for redeeming rewards. As illustrated, a reward redemption request is received (block 1405). The redemption request is parsed to identify the type of reward requested, and the amount of the reward requested (block 1410). Next, an account and/or account group that accrues the reward type is identified (block 1415). In some cases, this can include identifying an account within an account group to which the requestor is associated. In particular cases, this can include identifying an account owned by the requester, while in yet other cases, this can involve identifying an account otherwise unrelated to the requester.

It is determined if the identified account has a sufficient award available to satisfy the reward redemption request (block 1420). Where the identified account has an insufficient reward, another account is identified that accrues the reward type (block 1425). It is then determined if a combination of the identified accounts have a sufficient reward to satisfy the request (block 1430). Where the reward is still insufficient, yet another account is identified and the process repeated until a sufficient reward is found (blocks 1425, 1430).

Once a sufficient reward is found (blocks 1420, 1430), it is determined if private or public settlement of a reward transfer is available (block 1445). Where the settlement is private, the reward is simply redeemed, and the amount of the reward deducted from the identified account(s) (block 1450). In general, where the identified accounts including a reward(s) used to satisfy the redemption request is within an account group, or is otherwise associated with the requestor, then private settlement is used. In such cases, an entity operating a reward exchange merely accesses rewards and fulfills reward redemption requests in accordance with rules, or dependent strategies, associated with various accounts and/or account groups. It is left to the members of a particular account group, or co-owners of a particular account to determine a value of the accessed reward and to settle between themselves terms for exchanging the reward.

Alternatively, where the requestor is otherwise unrelated to the account from which the reward is derived, a public settlement process can be implemented. In such a public settlement process, a reward accessed from an account can be converted to a common value, such as, a cash value (block 1435). This value can be set by the account owner, or a market value may be used that represents a going rate for the reward type. The common value of the reward is then transferred from an account associated with the requester to the account from which the reward is being accessed (block 1440). With settlement for the reward exchange thus accomplished, the reward is redeemed, and the reward amount deducted from the identified and compensated account(s) (block 1450). Of course, it should be recognized that a public exchange could be provided and used in relation to account groups.

As an example, where a hotel stay certificate requiring 10000 bonus points is requested, an account that accrues that type of bonus points is identified. In this example, a person requesting the certificate is a member of an account group that includes the identified account. The account group further includes dependent strategies regarding the redemption of rewards associated with the account group, and the members of the account group provide for private settlement of exchanges. Because of this, the hotel stay certificate is simply provided to the requester, and the 10,000 bonus points are deducted from the identified account.

Alternatively, where the requestor is unrelated to the identified account, and a public settlement is used, the bonus points may be valued at one cent each. Based on this value, one hundred dollars is transferred from an account associated with the requester to the identified account. Further, the requester is provided with the hotel stay certificate, and the 10,000 bonus points are deducted from the identified account.

Figure 15:
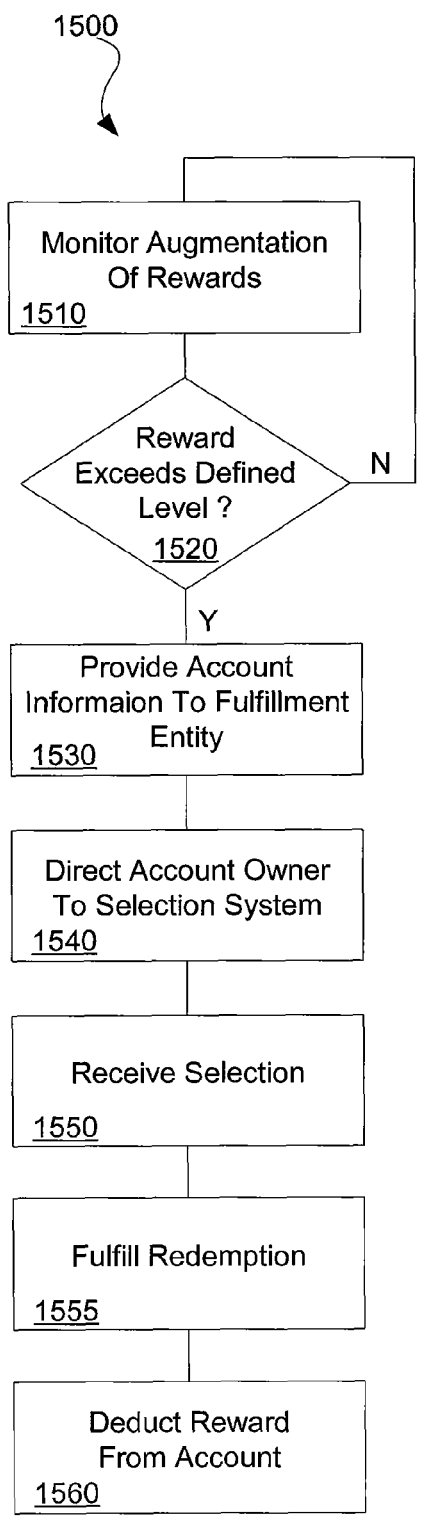
FIG. 15 illustrates a flow diagram for redeeming reward redemption requests in accordance with embodiments of the present invention, where redemption requests are automatically generated.

Turning to FIG. 15, a flow diagram 1500 illustrates another embodiment in accordance with the present invention for redeeming rewards. As illustrated, augmentation of rewards associated with an account and/or account group is monitored (block 1510). As previously discussed, augmentation of a reward can be based on activities including, but not limited to, travel, purchases, use of a financial account, years of service to an employer, payment for insurance benefits, and the like. It is then determined if a reward exceeds a predefined level (block 1520). For example, it may be determined that an account has more than 20,000 bonus points available that can be exchanged for merchandise. Where the amount of the reward has not reached the pre-defined level, the monitoring continues.

Alternatively, where the threshold has been met, the account information including the reward type and amount is provided to a fulfillment entity responsible for redeeming the reward (block 1530). In some cases, the fulfillment entity can be a party other than the party maintaining the accounts to which the various rewards are accruing. Thus, for example, the fulfillment entity can be a retailer supplying merchandise in exchange for the accrued reward(s). As yet another example, the fulfillment entity can be a service provider, such as an airline, providing services in exchange for the accrued reward(s).

The account owner, or designated group owner is then directed to a fulfillment interface, or selection system (block 1540). Such a fulfillment interface can include an Internet web page that includes a variety of selections offered by the fulfillment entity in exchange for the accrued bonus. Thus, for example, the web page may include a product catalog of a retailer with corresponding costs for items listed in terms of the reward type. Alternatively, the fulfillment interface can be an IVR or other automatic interface system capable of providing an owner of a reward with exchange options.

A selection is received from the reward owner via the fulfillment interface (block 1550). The cost of the selection in terms of the reward type is then computed, the corresponding amount of the reward deducted from the reward owner's account, and the redemption fulfilled by providing the selected merchandise, service, or other value to the reward owner (blocks 1555, 1560).

Group Non-Monetary Transactions

In addition to group monetary transactions, such as authorizing a transaction or allocating a payment, group non-monetary transactions are also needed to support groups. A non-monetary transaction is a transaction that affects information for one or more accounts within the group, but does not affect the monetary information for the account. For example, a change in billing address is a non-monetary transaction, whereas the application of a payment is a monetary transaction. Other examples of non-monetary transactions include linking an account to an existing group, delinking one or more accounts from a group, changing the primary owner of a group, or changing the dependent strategy for a dependent account.

Group non-monetary transactions can be used in both batch and on line processing. Group non-monetary transactions update multiple accounts within a group in response to a single input of the updated information. To update the accounts in a group with updated group information, the accounts within the group are identified. The accounts are identified using the group master data. As described in connection with FIG. 4B, the accounts in a group can be identified using the Group Member file. Once the financial records are identified, then the financial records are updated with the new information.

Group non-monetary transactions also support the selective updating of accounts within the group. For example, if only certain accounts within the group are to receive the updated information, then the accounts in the group are identified and one or more of the accounts is selected and the selected account(s) is updated with the new information. In an on-line environment, an operator can select the accounts that are to receive the updated information. In a batch environment, the updated information and the account numbers for the selected accounts can be submitted in batch.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for redeeming rewards, the method comprising:
   receiving at a computer system having a processor a reward redemption request associated with an account, wherein the reward redemption request includes a reward amount required to be provided in order to receive a redemption;
   determining with the computer system an award associated with the account, wherein the award comprises a current award level that can be applied to obtain a redemption if the current award level is at least equal to the reward amount;
   determining with the computer system that the reward amount is greater than the current reward level associated with the account; and
   when the reward amount is greater than current reward level, determining that the current reward level is likely to reach the reward amount in a certain time based at least in part on the activity of the account, and if so then satisfying the redemption request.

2. The method of claim 1, the method further comprising:
   augmenting the reward associated with the account based at least in part on activity in the account.

3. The method of claim 2, the method further comprising:
   determining that the reward amount is within a predefined amount of the reward associated with the account; and
   satisfying the reward redemption request.

4. The method of claim 3, wherein the predefined amount is a time period, the method further comprising:
   determining a reward accrual velocity; and
   wherein determining that the reward amount is within the predefined amount includes determining an estimated time until the reward amount is less than the reward associated with the account.

5. The method of claim 1, wherein the account is a vacation days account, and wherein the reward redemption request is for vacation days.

6. The method of claim 1, wherein the account is a financial account.

7. The method of claim 4, wherein the reward redemption request for a reward selected from a group consisting of: frequent flyer miles, value exchangeable for merchandise, and hotel stays.

8. A method for redeeming rewards, the method comprising:
   receiving at a computer system having a processor a reward redemption request, wherein the reward redemption request includes a reward amount required to be provided in order to receive a redemption;
   determining with the computer system an award associated with the account, wherein the award comprises a current award level that can be applied to obtain a redemption if the current award level is at least equal to the reward amount;
   identifying an account group to which the reward redemption request applies, wherein the account group includes at least a first account and a second account;
   determining the reward amount is greater than an accrued reward accessible via the account group; and
   when the reward amount is greater than current reward level, determining that the current reward level is likely to reach the reward amount in a certain time based at least in part on the activity in the account, and if so then satisfying the redemption request.

9. The method of claim 8, wherein the accrued reward is maintained in a reward pool.

10. The method of claim 9, wherein the accrued reward is augmented based on activity associated with the first account.

11. The method of claim 10, wherein the accrued reward is augmented based on activity associated with the second account.

12. The method of claim 9, wherein the reward pool accrues sick days, and wherein the reward redemption request is for sick days.

13. The method of claim 9, wherein the first account and the second account are financial accounts.

14. The method of claim 13, wherein the reward redemption request for a reward selected from a group consisting of: frequent flyer miles, value exchangeable for merchandise, and hotel stays.

15. The method of claim 8, the method further comprising:
   augmenting the accrued reward based on activity associated with the first account;

determining that the reward amount is less than the augmented accrued reward; and
satisfying the reward redemption request.

16. The method of claim 8, the method further comprising:
augmenting the accrued reward based on activity associated with the first account;
determining that the reward amount is within a predefined amount of the augmented accrued reward; and
satisfying the reward redemption request.

17. The method of claim 16, wherein the predefined amount is a time period, the method further comprising:
determining a reward accrual velocity; and
wherein determining that the reward amount is within the predefined amount includes determining an estimated time until the reward amount is less than the reward associated with the account.

* * * * *